(12) United States Patent
Kurihashi et al.

(10) Patent No.: US 6,457,647 B1
(45) Date of Patent: *Oct. 1, 2002

(54) MEMORY CARD ADAPTOR TO FACILITATE UPGRADES AND THE LIKE

(75) Inventors: Toshiya Kurihashi, Kokubunji; Masahiko Morita, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/780,715

(22) Filed: Jan. 8, 1997

Related U.S. Application Data

(63) Continuation of application No. 08/340,889, filed on Nov. 15, 1994, now abandoned.

(30) Foreign Application Priority Data

Nov. 16, 1993 (JP) ................................................. 5-309747
Apr. 28, 1994 (JP) ................................................. 6-091130

(51) Int. Cl.[7] .................................................. G06K 7/00
(52) U.S. Cl. ........................ 235/486; 235/441; 439/945
(58) Field of Search ........................... 235/486, 462.01, 235/375, 441; 439/945, 946

(56) References Cited

U.S. PATENT DOCUMENTS

| | | | | |
|---|---|---|---|---|
| 5,155,663 A | * | 10/1992 | Harase et al. | 439/945 |
| 5,184,282 A | * | 2/1993 | Kaneda et al. | 235/495 |
| 5,258,604 A | * | 11/1993 | Behrens et al. | 235/462 |
| 5,296,692 A | * | 3/1994 | Shino | 235/486 |
| 5,357,573 A | * | 10/1994 | Walters | 380/25 |
| 5,438,359 A | * | 8/1995 | Aoki | 348/207 |
| 5,526,233 A | * | 6/1996 | Hayakawa | 235/488 |
| 5,644,757 A | * | 7/1997 | Lee | 395/501 |

FOREIGN PATENT DOCUMENTS

| | | | |
|---|---|---|---|
| JP | 61-148525 | 7/1986 | |
| JP | 0028892 | * 2/1987 | 235/486 |
| JP | 2-268390 | * 11/1990 | 235/486 |
| JP | 0014192 | * 1/1991 | 235/486 |
| JP | 3141486 | * 6/1991 | 235/486 |
| JP | 3194680 | * 8/1991 | 235/486 |
| JP | 4-205079 | * 7/1992 | 235/486 |
| JP | 4-273319 | 9/1992 | |
| JP | 5-24307 | * 9/1993 | 235/486 |
| JP | 5242307 | * 9/1993 | 235/486 |
| JP | 5-258822 | 10/1993 | |

* cited by examiner

*Primary Examiner*—Michael G. Lee
*Assistant Examiner*—Daniel St. Cyr
(74) *Attorney, Agent, or Firm*—Fitzpatrick, Cella, Harper & Scinto

(57) ABSTRACT

A memory card adaptor comprising an adaptor main body detachably insertable in a memory card slot of a piece of information equipment; a first connector based on standard specifications, provided on the adaptor main body and adapted to be connected to a connector provided in the memory card slot; a mounting portion provided on the adaptor main body and adapted to detachably receive a memory card which is detachably inserted into a memory card slot of another piece of equipment different from the information equipment, for effecting exchange of information signals in serial data form with the external equipment; and a second connector not based on the standard specifications, provided on the mounting portion and adapted to be connected with a connector provided on the memory card and corresponding to a connector in the memory card slot of the external equipment; wherein exchange of information signals in serial data form is enabled between the information equipment and the memory card by insertion of the adaptor main body, with the memory card mounted in the mounting portion, into the memory card slot of the information equipment.

20 Claims, 19 Drawing Sheets

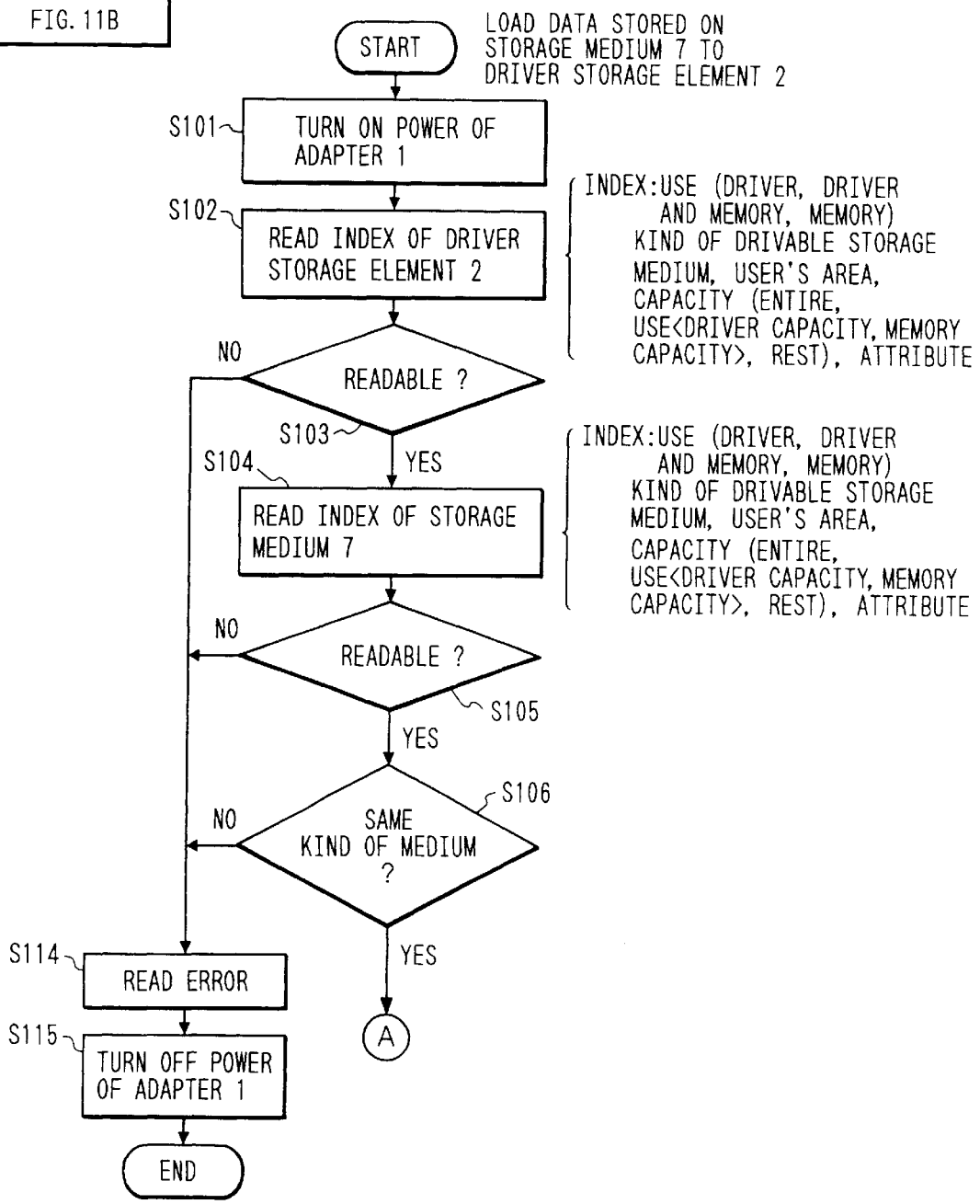

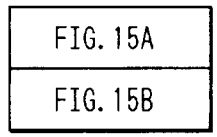
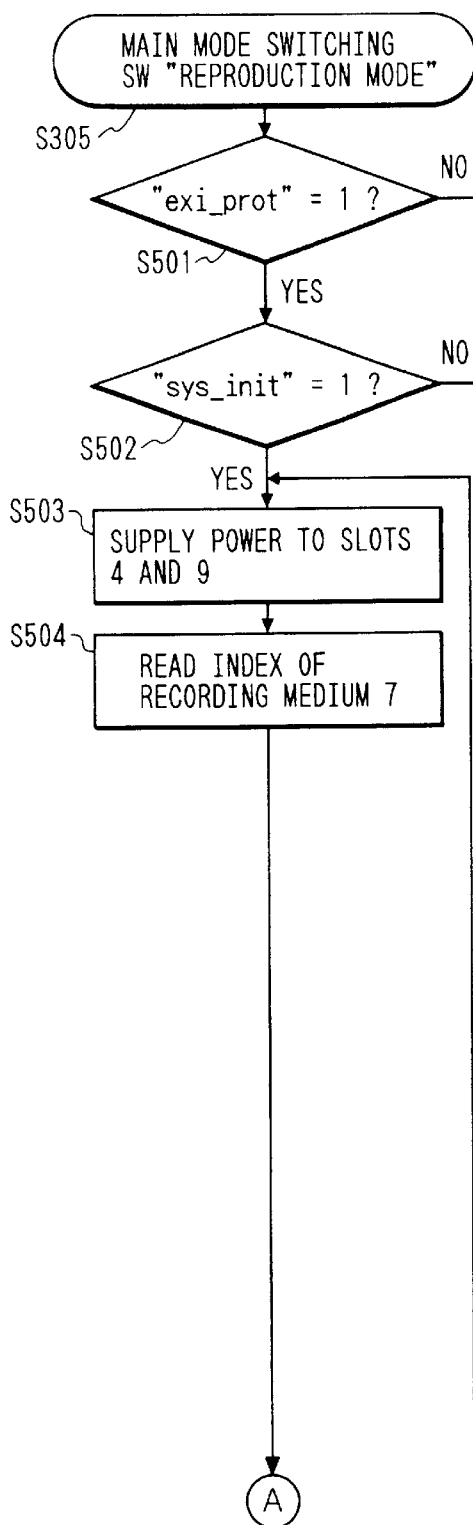
FIG. 15A
FIG. 15

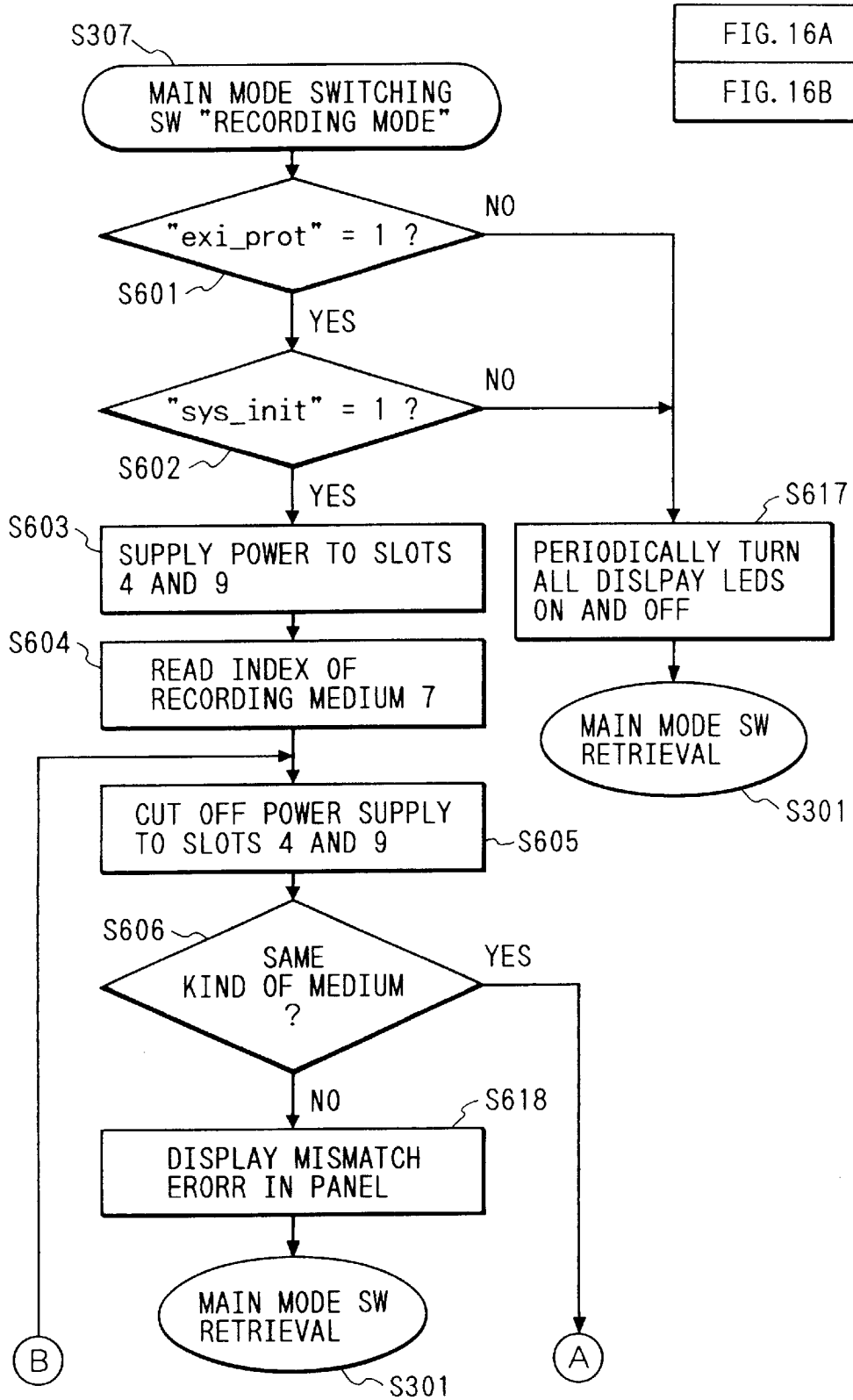

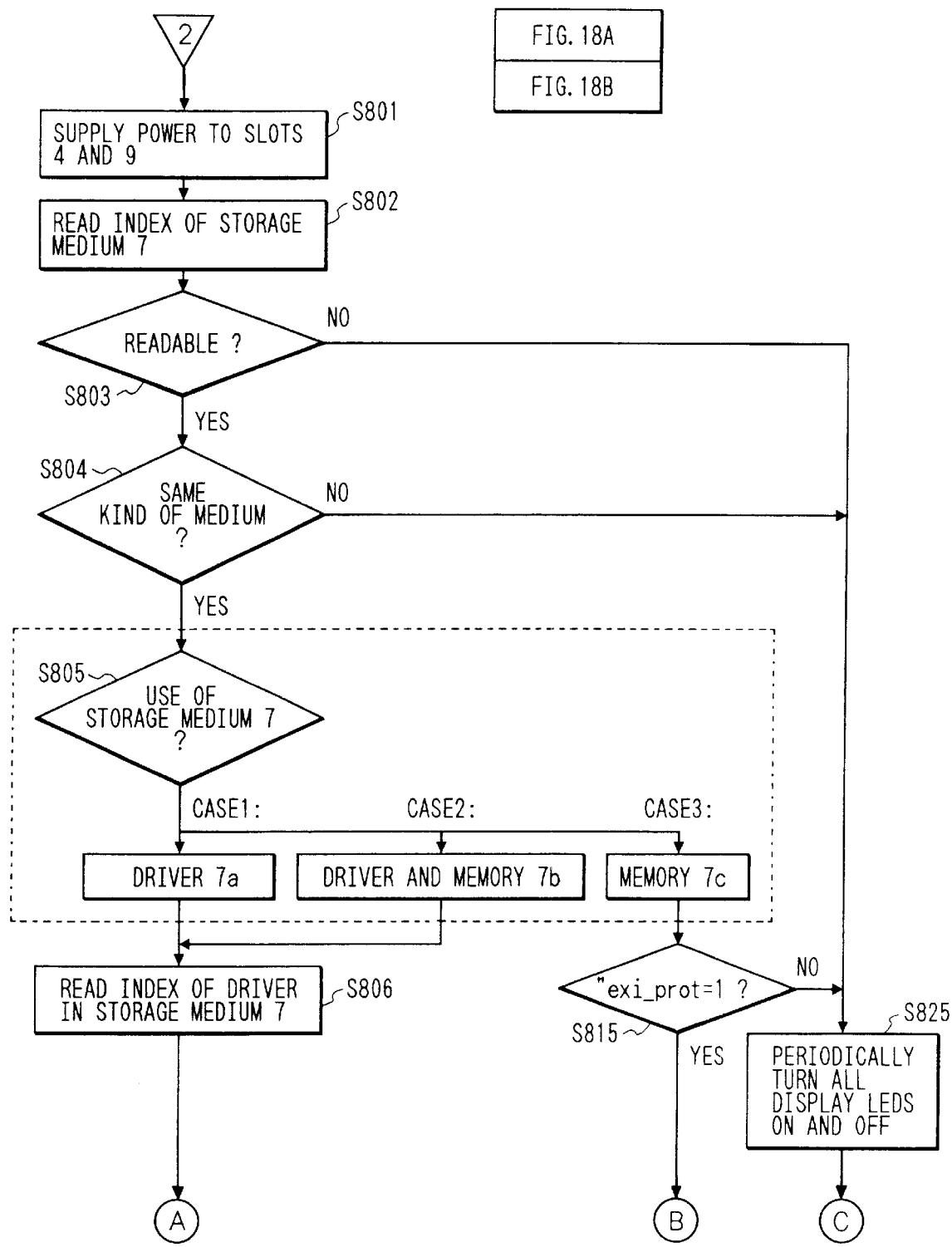

MEMORY CARD ADAPTOR TO FACILITATE UPGRADES AND THE LIKE

This application is a continuation of Application No. 08/340,889, filed Nov. 15, 1994, now abandoned.

BACKGROUND OF THE INVENTION

1. Field of the Invention

The present invention relates to a data memory system utilizing an adaptor for connecting a memory card, which is detachably insertable in a memory card slot of for example a digital electronic still camera for exchanging information signals with said digital electronic still camera, with a computer such as a work station or a personal computer.

2. Related Background Art

In the conventional apparatus for data writing into and/or data reading from a detachable memory medium such as a magnetic disk, a magnetooptical disk, a rigid disk or a semiconductor memory such as flash memory, EEPROM, SRAM or DRAM, each time the kind of memory medium is changed or a new memory medium is developed, it has been necessary to replace the memory medium control means (hereinafter called a driver) and the means for memorizing said driver (hereinafter called a driver storage element) provided in the above-mentioned apparatus with a driver capable of driving such new memory medium or to add a new driver storage element itself in the apparatus.

The technology of the recent card-shaped memory media (hereinafter called IC card) is being diversified, utilizing various memory media such as the magnetooptical disk, the rigid magnetic disk and semiconductor memories such as flash memory, and even includes IC cards not provided with means for controlling the memory elements within the memory medium itself. On the other hand, in equipment showing marked tendency of compactization, such as digital still cameras or notebook personal computers, it is considered essential to be equipped with not only an internal memory medium but also a detachable memory medium. Based on these two factors, the above-mentioned IC card not provided with control means for the memory elements is anticipated effective for further compactization of various equipment, such as those mentioned above.

However, in such equipment in the course of compactization, the selection of the memory medium is often influenced by the trend of development of memory media. Also, for adding new plural memory media to those in the equipment or for upgrading such memory media already used to new ones, it becomes necessary to increase the number of the driver storage elements provided in the equipment, and there is required a large space therefor. Consequently, such increase or upgrading of memory media is difficult in equipment requiring compactization, such digital still cameras and notebook-sized personal computers.

As explained in the foregoing, though the recent memory media can respectively provide various advantages, it has not been possible to select such recording media easily and inexpensively according to the application,or situation. Also it has been difficult to adapt promptly to improvements in performance or capacity of the memory medium when the form thereof is changed, and to maintain compatibility depending on the equipment employing such memory media.

Also, the connector of the memory card, constituting a memory medium, is based on standard specifications and can therefore be inserted into the memory card slots of most computers. However, such connector, not being designed in consideration of very frequent attachments and detachments of the memory card, has a very large number of connecting contacts and may therefore suffer from defective contact. Also such connector with a large number of contacts may lead to the destruction of the connector as it requires a large force in extraction from the memory card slot.

On the other hand, a memory card connector not based on standard specifications can be improved in mechanical strength by increase in size of the connecting contacts, as the number thereof can be decreased. However, such memory card connector, not based on the standard specifications, cannot be used by direct insertion into the memory card slot of computers. For this reason, for connecting such memory card to the computer, there is required an external device such as an exclusive memory card drive equipped with an external interface such as RS-232C or SCSI, and there inevitably results an increase in the total cost of the system.

SUMMARY OF THE INVENTION

In consideration of the foregoing, a first object of the present invention is to provide an adaptor for the memory card, enabling use of a memory card provided with a serial interface not based on the standard specifications, in the same manner as the memory card provided with a parallel interface based on the standard specifications, without the use of an external device such as an exclusive memory card drive.

The above-mentioned object can be attained, according to an embodiment of the present invention, by an adaptor comprising an adaptor main body detachably insertable into the memory card slot of an information equipment. A first connector which is provided on said adaptor main body, is based on the standard specifications and can be connected to the connector in said memory card slot. A mounting portion is provided on said adaptor main body and detachably receives a memory card that is detachably insertable in a memory card slot of an external equipment, different from said information equipment, for effecting exchange of information signals in serial data with said information equipment, while a second connector, which is provided in said mounting portion, is not based on the standard specifications and is adapted to be connected to a connector corresponding to the connector in the memory card slot of said external equipment, wherein said adaptor main body, with said memory card mounted on said mounting portion, is inserted into the memory card slot of said information equipment, thereby enabling the exchange of information signals in serial data between said information equipment and said memory card.

According to the above-mentioned embodiment, by inserting a memory card with a serial interface into the mounting portion of the adaptor main body and inserting said adaptor main body into the memory card slot of the information equipment, the information signals can be exchanged in serial data format between said information equipment and said memory card.

A second object of the invention of the present application is to enable the use of plural memory media in a single piece of equipment.

The third object of the invention of the present application is to enable a piece of equipment to adapt to a variation in the memory medium, without modification in the equipment itself.

The fourth object of the invention of the present application is to enable variation of the memory medium, within a limited space in a piece of equipment.

The fifth object of the invention of the present application is to maintain compatibility of the memory medium, by enabling access, in an equipment, to the data of a memory medium recorded in another piece of equipment.

The sixth object of the invention of the present application is, in the case of a change in the memory medium, to enable loading of the driver, memorized in a detachable memory medium, into a driver memory device.

The seventh object, of the invention of the present application is, in the case of a change in the memory medium, to enable loading of the driver, corresponding to a detachable memory medium, from the main body of the equipment into a driver storage element.

The eighth object of the invention of the present application is to minimize the number, to one at minimum, of the slots provided in the equipment.

The ninth object of the invention of the present application is to facilitate discrimination as to whether a detachable memory medium mounted on a piece of equipment can be handled by said equipment.

The tenth object of the invention of the present application is to facilitate identification of the content, application and property of a detachable memory medium mounted on a piece of equipment.

The eleventh object of the invention of the present application is to reduce the running cost, and the design and manufacturing costs of the equipment including the data storage device.

The foregoing objects can be attained, according to an embodiment of the present invention, by an adaptor provided with a slot capable of holding and electrically connecting with a detachable memory medium, and means for electrically engaging with a device for data write-in to and/or data read-out from said memory medium, wherein said adaptor comprises means (driver storage element) for memorizing means (driver) for controlling said detachable memory medium, and the memory medium control means memorized in said memory means is rewritable. Said adaptor further comprises a controller, including data memory means therein, for causing said driver, memorized in said driver storage element, to directly drive said memory medium.

In the above-mentioned configuration, said memory medium control means also contains, in addition to the basic means for such control, index data indicating the kinds of drivable memory media (for example semiconductor memory such as flash memory, EEPROM, SRAM or DRAM, magnetooptical aft disk, magnetic disk, rigid disk, etc.), applications (for example of recording medium and/or control means therefor), total capacity, used capacity (by the recording medium or the control means therefor), user's area and associated properties.

It is also rendered possible to drive all the memory media mentioned above by mounting such media on said adaptor, without modification in the main equipment itself, by providing the driver storage element, conventionally provided in said equipment, in the detachable adaptor and varying the driver on said driver storage element. Also in this manner there can be maintained the compatibility of the memory media.

Also, in the case of a change of the driver in said driver storage element, by providing the driver with data representing the feature of the driver as the index data mentioned above, the equipment mounted with said adaptor is rendered capable of discriminating the memory media drivable by said driver, and also discriminating whether the driver storage element on said driver memorizes the driver. Furthermore, the equipment mounted with said adaptor is rendered capable of discriminating whether the memory medium, mounted on said adaptor, is drivable by said driver.

Furthermore, by clarifying the configuration of the internal uses by the index data and dividing the capacity as explained in the foregoing, it is rendered possible to displace the addresses in the memory medium in relative manner and to form the driver and the memory within the same memory medium.

By utilizing these features, it is made possible to load a driver, prepared for example in the software development for the equipment, from said equipment into the driver storage element of said adaptor, or to store said driver in the memory medium and to fetch into the driver storage element of said adaptor under the control from the equipment. In this manner the number of slots of the equipment can be minimized, even to as few as one, at minimum.

In an equipment of small package size such as a digital still camera or a notebook-sized personal computer, a memory medium not provided with means for controlling the memory elements thereof is effective for achieving compactization of the main body of said equipment, and there can also be conceived equipment capable of directly supporting such memory medium and enabling connection thereof. However, the above-explained adaptor enables the utilization of such memory medium not provided with the control means even with equipment previously produced. In addition, said adaptor allows, in the small-package equipment mentioned above, utilization of various memory media, without the limitation in the kinds of usable memory media without the control means.

Also, in a desk-top personal computer or a work station in which a larger space is available for expansion, it is rendered possible, by fitting the above-explained adaptor in an already available slot, to utilize the above-mentioned memory media of new type and to make access to the data prepared in other equipment.

Still other objects of the present invention, and the features thereof, will become fully apparent from the following description, which is to be taken in conjunction with the attached drawings.

DETAILED DESCRIPTION OF THE PREFERRED EMBODIMENTS

Now the present invention will be clarified in detail by reference to the preferred embodiments thereof shown in the attached drawings.

Figure 1:
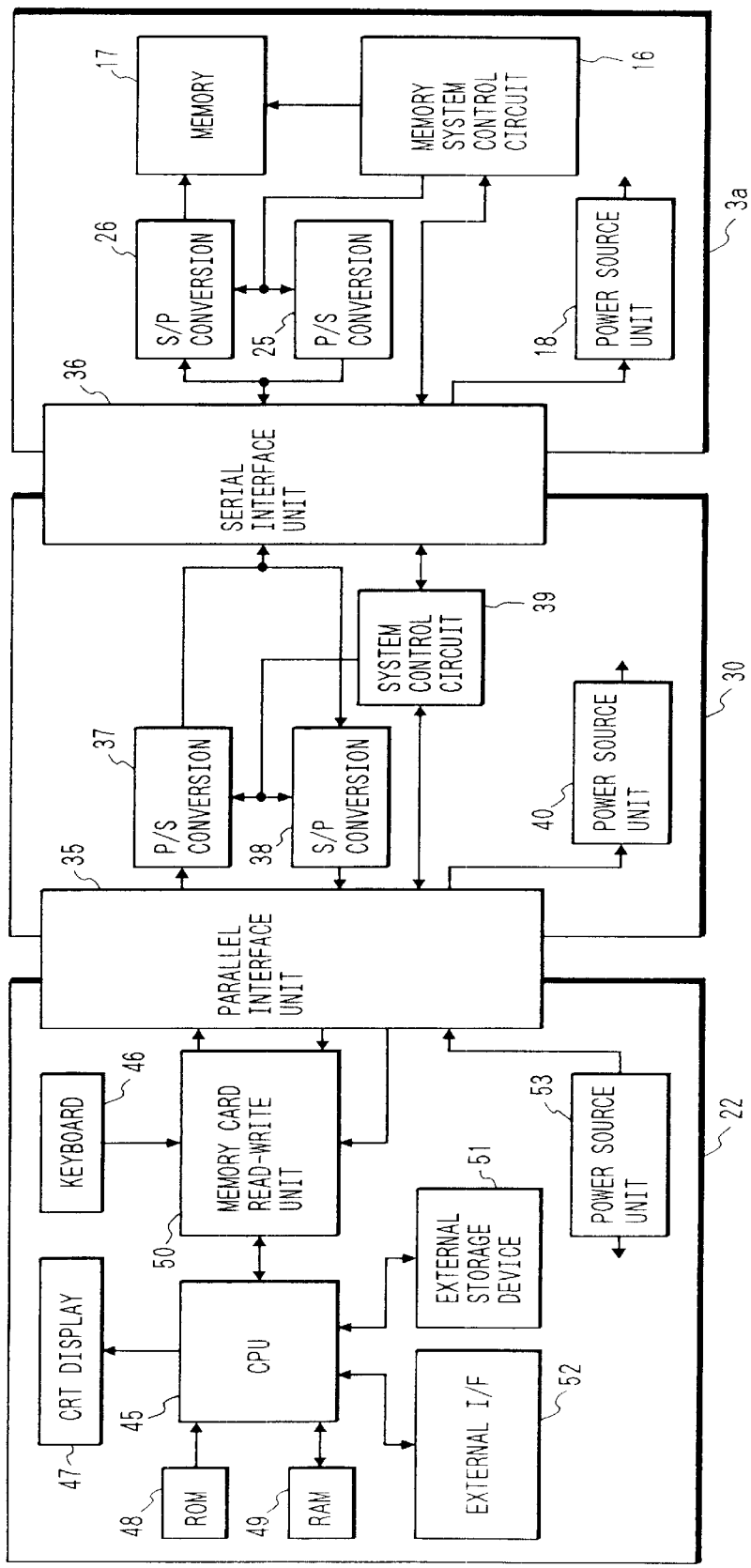
FIG. 1 is a block diagram showing a state in which a memory card is connected to a computer by a memory card adaptor of a first embodiment of the present invention.
Figure 2:
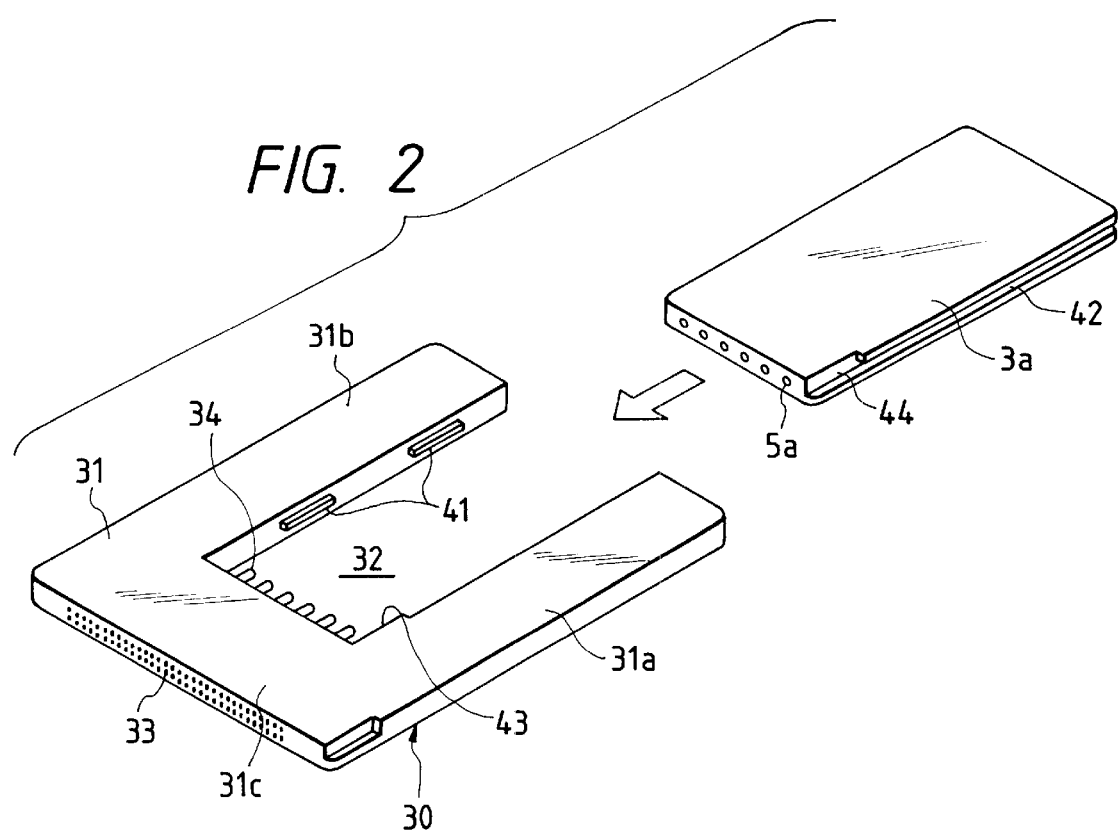
FIG. 2 is a perspective view showing the configuration of said memory card adaptor and a memory card to be fitted therein.
Figure 3:
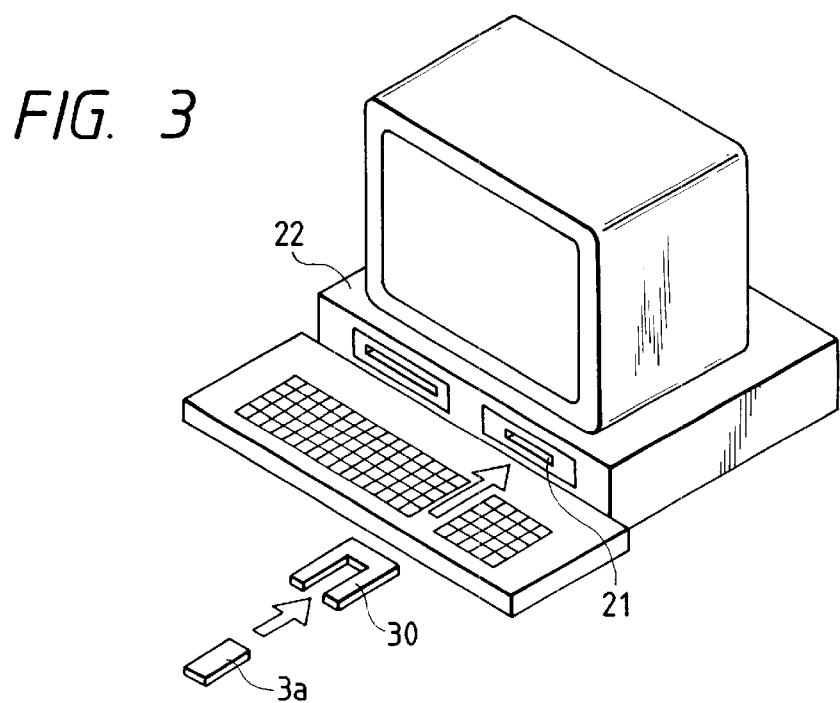
FIG. 3 is a perspective view of a computer to which the memory card is connected by means of said memory card adaptor.
Figure 4:
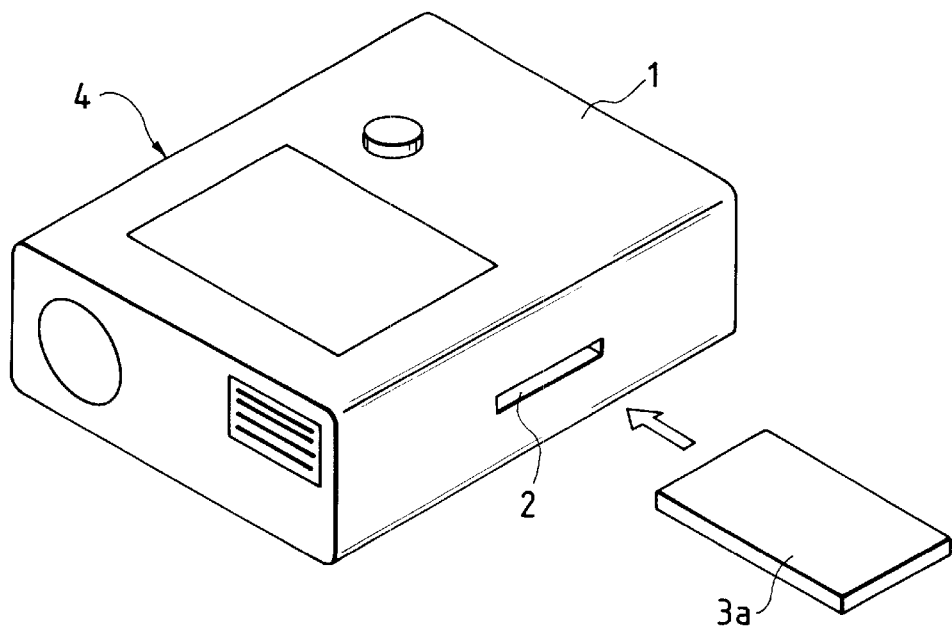
FIG. 4 is a perspective view of a digital electronic still camera to which said memory card is connected without said memory card adaptor.

A first embodiment of the present invention will be explained with reference to FIGS. 1 to 4. FIG. 1 is a block diagram showing a state in which a memory card $3a$ is connected to a computer 22 by a memory card adaptor constituting a first embodiment of the present invention; FIG. 2 is a perspective view showing the configuration of said memory card adaptor and a memory card to be fitted therein; FIG. 3 is a perspective view showing the configuration of a computer to which the memory card is connected through said memory card adaptor; and FIG. 4 is a perspective view of a digital electronic still camera to which the memory card is connected without said memory card adaptor.

In FIGS. 1 and 2, a memory card adaptor 30 of the present invention is provided with an adaptor main body 31 of a square-U shaped planar form, as shown in FIG. 2, and said adaptor main body 31 is detachably insertable into a memory card slot 21 of the computer (information equipment) 22 shown in FIG. 3.

The memory card $3a$ can be detachably mounted in a mounting portion 32, formed between lateral pieces $31a$, $31b$ of the adaptor main body 31. An intermediate piece $31c$ thereof is provided, on an external face, with a first connector 33, and, on an internal face thereof, with a second connector 34. Said first connector 33, composed of plural female connecting contacts and based on standard specifications, is to be connected to an unrepresented connector, composed of male connecting terminals, in a memory card slot 21 of the computer 22. The second connector 34, composed of male connecting terminals of a number less than that of the terminals of the first connector 33 and not based on the standard specifications, is to be detachably connected to a connector $5a$ provided on an end face of the memory card $3a$ and composed of female connecting terminals.

The first connector 34 of the adaptor main body 31 constitutes, together with the connector in the memory card slot 21 of the computer 22, a parallel interface 35 (cf. FIG. 1). Also, the second connector 34 of said adaptor main body 31 constitutes, together with the connector $5a$ of the memory card 3, a serial interface 36 (cf. FIG. 1).

Inside the adaptor main body 31, there are provided, as shown in FIG. 1, a P/S conversion circuit 37 for converting parallel data into serial data, a S/P conversion circuit 38 for converting serial data into parallel data, a system control circuit 39 for controlling the entire adaptor 30, and a power source unit 40 for supplying the driving electric power for the adaptor 30.

On mutually opposed faces of the lateral pieces $31a$, $31b$ of the adaptor main body 31, there are formed engaging projections 41, and engaging grooves 42, adapted to engage with said engaging projections, 41, are formed on both lateral faces of the memory card $3a$. When the memory card $3a$ is fitted into the mounting portion 32 of the adaptor main body 31, said engaging grooves 42 respectively engage with the engaging projections 41 whereby the memory card $3a$ can be supported in the mounting portion 32 without undesired detachment therefrom and the second connector 34 of the adaptor main body 31 is protected from undesired load.

At an internal corner of the adaptor main body 31 there is provided an impingement projection 43, adapted to engage with a recess 44 formed at a corner of the memory card $3a$. When the memory card $3a$ is mounted with a correct direction into the mounting portion 32, the impingement projection engages with the recess 44 whereupon the connector $5a$ of the memory card $3a$ can be properly connected to the first connector 33 of the adaptor main body 31. On the other hand, if the memory card $3a$ is mounted erroneously in the opposite direction in the mounting portion 32, the end face of the memory card $3a$ impinges on the impingement projection 43, so that the connector $5a$ of the memory card $3a$ cannot be connected to the first connector 33 of the adaptor main body 31 and the operator can recognize the erroneous insertion in the wrong direction.

The computer 22 is provided, as shown in FIG. 1, with a CPU (central processing unit) 45, a keyboard 46 with plural keys for entering various information, a CRT display 47 for graphic information display, a ROM (read-only memory) 48 storing control-programs to be executed by the CPU 45, a RAM (random access memory) 49 for data storage, a memory card read/write unit 50 adapted to effect data reading from and data writing into the memory card $3a$ and based on the standard specifications, an external memory unit 51, such as a floppy disk drive, for data storage, an external interface (I/F) 52, for example of RS-232C or SCSI type, and a power source unit 53 for supplying the electric power for driving the computer 22.

The memory card $3a$ is provided therein with a memory system control circuit 16, a memory 17, a power source unit 18, a P/S conversion circuit 25 and a S/P conversion circuit 26.

Figure 7:
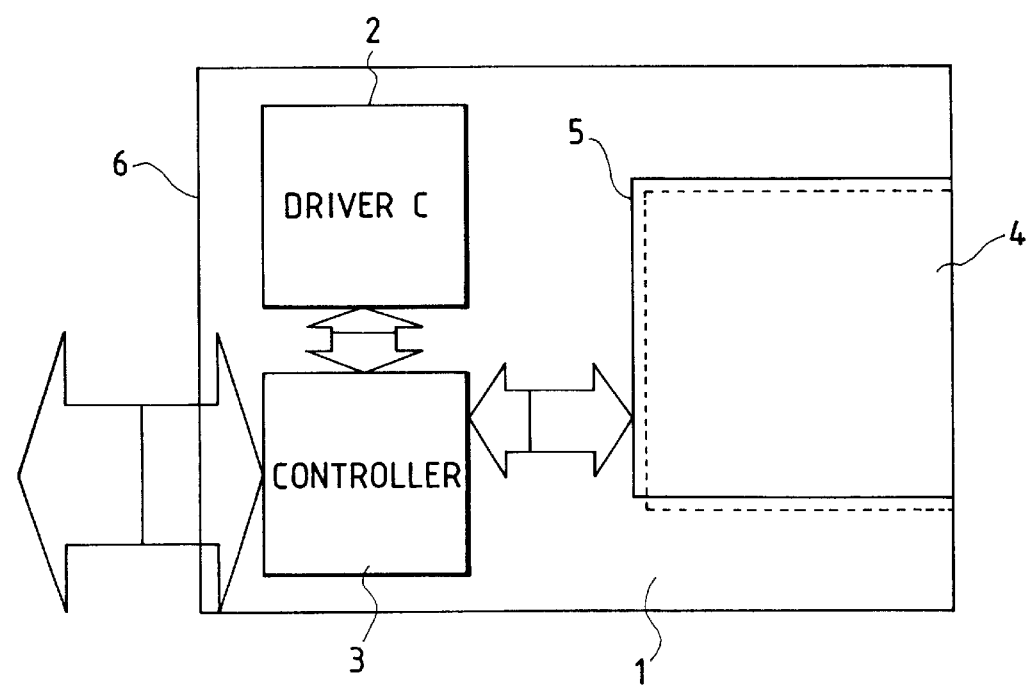
FIG. 7 is a schematic view showing the structure of an adaptor of the present invention.

In the above-explained configuration, FIG. 4 shows a state of a phototaking operation with the digital electronic still camera, wherein the memory card $3a$ is directly inserted in a memory card slot 2 of said camera 4, without the memory card adaptor 30 of the present invention, as in the conventional configuration shown in FIG. 7. The image signals obtained by photoelectric conversion in an image pickup device such as CCD are thus stored in the memory card $3a$.

Figure 11B:
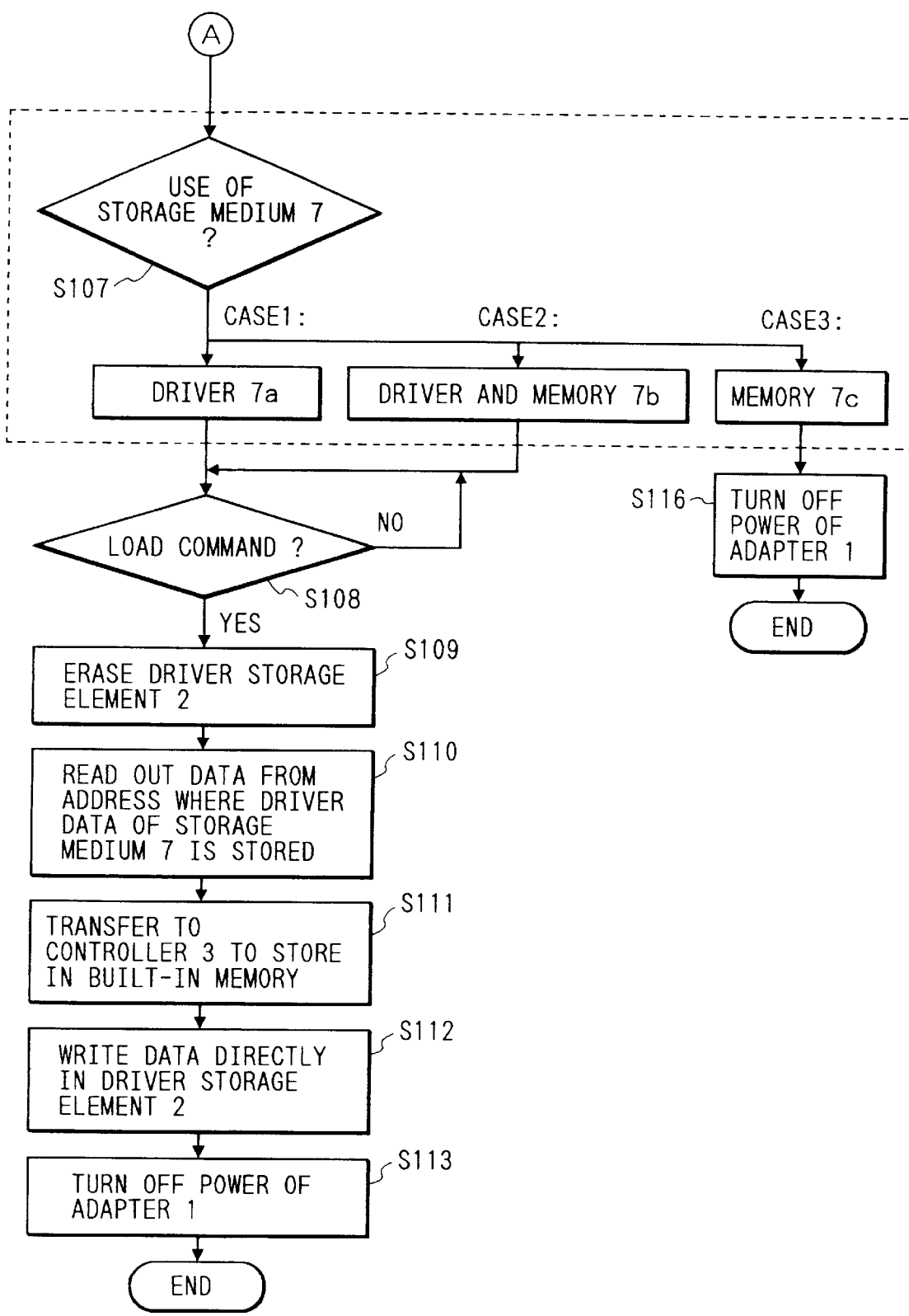
FIG. 11 is comprised of FIGS. 11A and 11B illustrating flow charts showing an example of loading driver data from the memory medium to the driver storage element.
Figure 12:
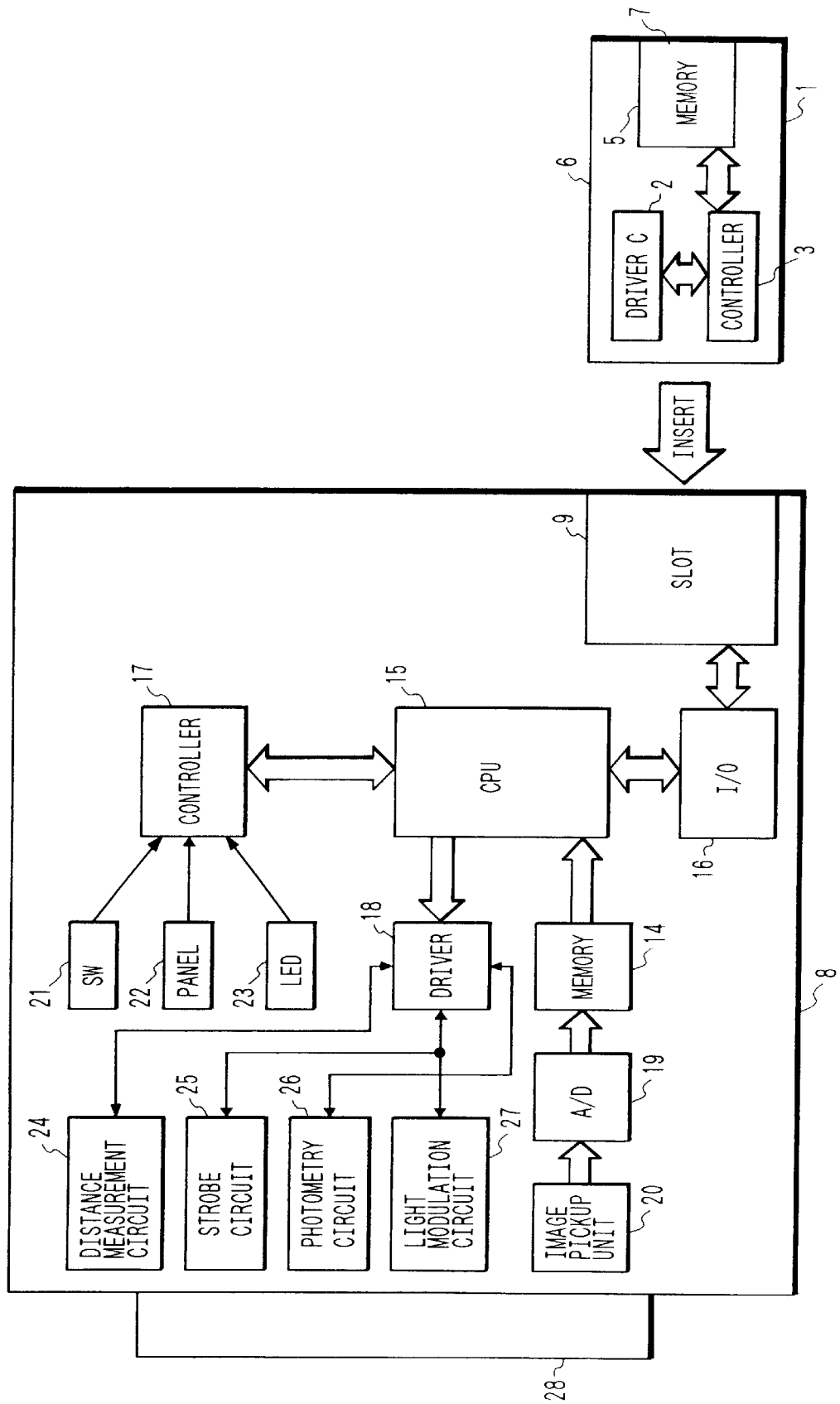
FIG. 12 is a view showing the structure of the adaptor of the present invention and of a digital still camera utilizing said adaptor.

In this state the exchange of the information signals between the digital electronic still camera 4 and the memory card $3a$ is conducted through the serial interface as in the conventional example shown in FIGS. 11A, 11B and 12, utilizing the stronger connector $5a$, with a reduced number of connecting terminals, of the memory card $3a$, and the external shape thereof is made compact for the convenience of carrying, without being based on standard specifications.

FIG. 3 shows a state of fetching the image data, recorded in the memory card 3a, into the computer 22. In this case the memory card 3a is mounted, as shown in FIG. 2, in the mounting portion 32 of the memory card adaptor 30 of the present invention, whereby the connector 5a of the memory card 3a is connected to the second connector 34 of said memory card adaptor 30. The exchange of information signals is achieved by inserting said memory card adaptor 30, bearing the memory card 3a as explained above, into the memory card slot 21 provided in the computer 22 and having a connector based on the standard specifications.

The signal flow in this state will be explained with reference to FIG. 1. The memory card 3a is the same in configuration as the memory card 3a shown in FIG. 12, and the image data stored in the memory 17 are converted into serial data by the P/S conversion circuit 25, and are released to the memory card adaptor 30 through the serial interface 36. These operations are controlled by the memory system control circuit 16. The power source unit 18 of the memory card 3a receives the electric power supply from the computer 22 through the memory card adaptor 30, but there may also be provided a back-up power source, depending on the kind of the memory 17.

In the memory card adaptor 30, the serial data received from the memory card 3a through the serial interface 36 are converted into parallel data by the S/P converter 38 and are released to the computer 22 through the parallel interface 35. These operations are controlled by the system control circuit 39. The power source unit 40 of the memory card adaptor 30 receives electric power supply from the computer 22 through the parallel interface 35, but a battery may be incorporated in the memory card adaptor 30.

The above-explained signal flow is inverted in case of recording the data, subjected to image processing in the computer 22, in the memory card 3a. More specifically, the image data subjected to image processing in the computer 22 are supplied, as parallel data, to the memory card adaptor 30 through the parallel interface 35. Said image data are converted into serial data by the P/S conversion circuit 37 of the memory card adaptor 30, then supplied to the memory card 3a through the serial interface 36, further converted into parallel data by the S/P converter 26 of the memory card 3a and stored in the memory 17.

By mounting the memory card 3a with the connector 5a not based on the standard specifications in the mounting portion 32 of the memory card adaptor 30 of the present embodiment as explained above, said memory card 3a can be handled in the same manner as the memory card equipped with a connector based on the standard specifications, and said memory card 3a can be connected with the computer 22 without relying on an exclusive external device such as a conventional memory card drive. Also, if the number of connections of the memory card 3a to the digital electronic still camera 4 is assumed equal to that of connections of the memory card 3a to the computer 22, the number of attachments and detachments of the connector 33 based on the standard specifications becomes equal to a half of the total number of attachments and detachments. Furthermore, in case the connector 33 based on the standard specifications is destructed, the economical burden to the user can be reduced because only the memory card adaptor 30, which is less expensive than the memory card 3a, needs to be replaced.

In the following there will be explained a second embodiment of the present invention with reference to FIG. 5, wherein same components as those in the foregoing first embodiment are represented by same numbers.

Figure 5:
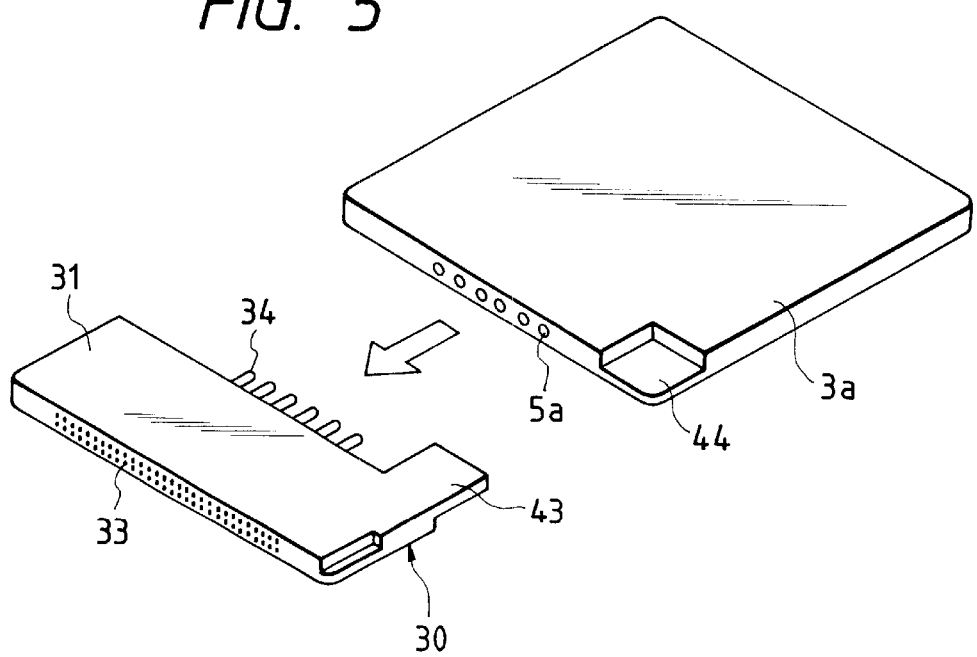
FIG. 5 is a perspective view showing the configuration of a memory card adaptor constituting a second embodiment of the present invention and a memory card to be fitted therein.

FIG. 5 is a perspective view showing the configuration of a memory card adaptor constituting a second embodiment of the present invention and a memory card to be fitted thereon. The present embodiment is different from the first embodiment in that the adaptor main body 31 is solely composed of the intermediate piece with an impingement projection 43 but, without lateral pieces like elements 31b, 31c, and without guide grooves like elements 42 shown in FIG. 2.

In the present embodiment of the above-mentioned configuration, the second connector 34 of the adaptor main body 31a is subjected to a certain additional load when the memory card 3a is mounted on the memory card adaptor 30, because of the absence of the guide mechanism for the memory card 3a by the engaging projections 41 on the memory card adaptor 30 as in the first embodiment, but the memory card 3a can be designed with a maximum size permissible therefor and the memory capacity can therefore be maximized.

Other configurations of the present embodiment, and functions and effects thereof, will not be explained, as they are same as those in the first embodiment.

In the following there will be explained a third embodiment of the present invention with reference to FIG. 6, wherein same components as those in the foregoing first embodiments are represented by same numbers.

Figure 6:
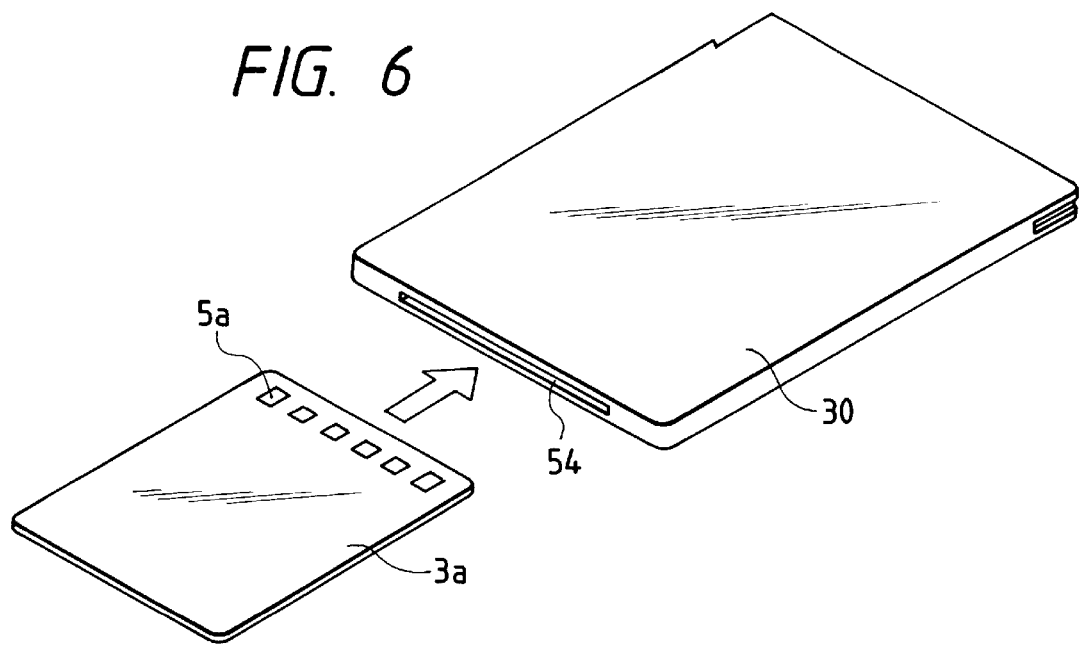
FIG. 6 is a perspective view showing the configuration of a memory card adaptor constituting a third embodiment of the present invention and a memory card to be fitted therein.

FIG. 6 is a perspective view showing the configuration of a memory card adaptor constituting a third embodiment of the present invention, and a memory card to be fitted thereon. The present embodiment is different from the first embodiment in that the adaptor main body 31 of the memory card adaptor 30 is provided with a memory card slot 54 in which the memory card 3a is detachably mounted, and that the connecting terminals of the connector 5a of the memory card 3a are composed of flat terminals.

The present embodiments provide an advantage of forming the memory card 3a thinner, as the connecting terminals of the connector 5a thereof are composed of flat terminals.

Other configurations of the present embodiment, and functions and features thereof, will not be explained further as they are the same as those in the first embodiment.

As detailedly explained in the foregoing, the memory card adaptor of the present invention, enabling exchange of the information signals between an information equipment and a memory card in the serial data form by the insertion of said memory card adaptor, with the memory card mounted thereon, into the memory card slot of said information equipment, provides the following advantages:

(1) By mounting a memory card not based on the standard specifications on the memory card adaptor, the integrated configuration becomes similar to that of the memory card of the standard specifications, currently used as the recording medium for various information equipment, and same connector and interface can be commonly used for both configurations. Consequently, connection with information equipment, such as computers, can be easily achieved without an increase in the total cost of the system, resulting from the use of an exclusive external device such as a conventional memory card drive;

(2) The service life of the connector can be extended in comparison with the case of the digital electronic still camera utilizing a memory card based on the standard specifications, as the number of attachments and detachments of the connector of the standard specification can be reduced approximately to a half; and (3) In the case that the connector of the standard specifications is destroyed, the economical burden an the user can be reduced, since only the inexpensive memory card adaptor needs to be replaced, instead of the memory card itself, incorporating a plurality of expensive memory devices.

Figure 8:
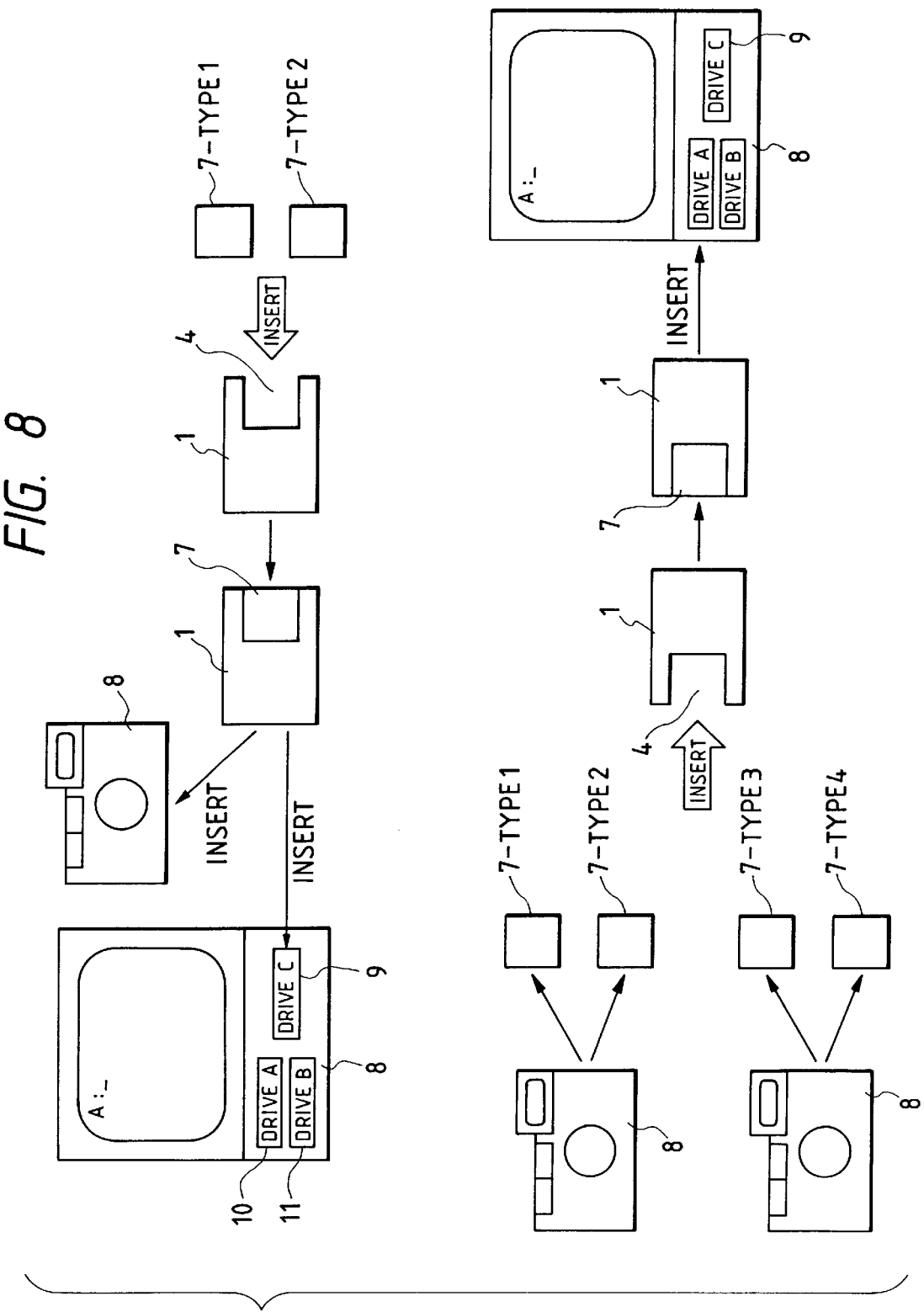
FIG. 8 is a view showing examples of equipment utilizing the adaptor of the present invention.
Figure 9:
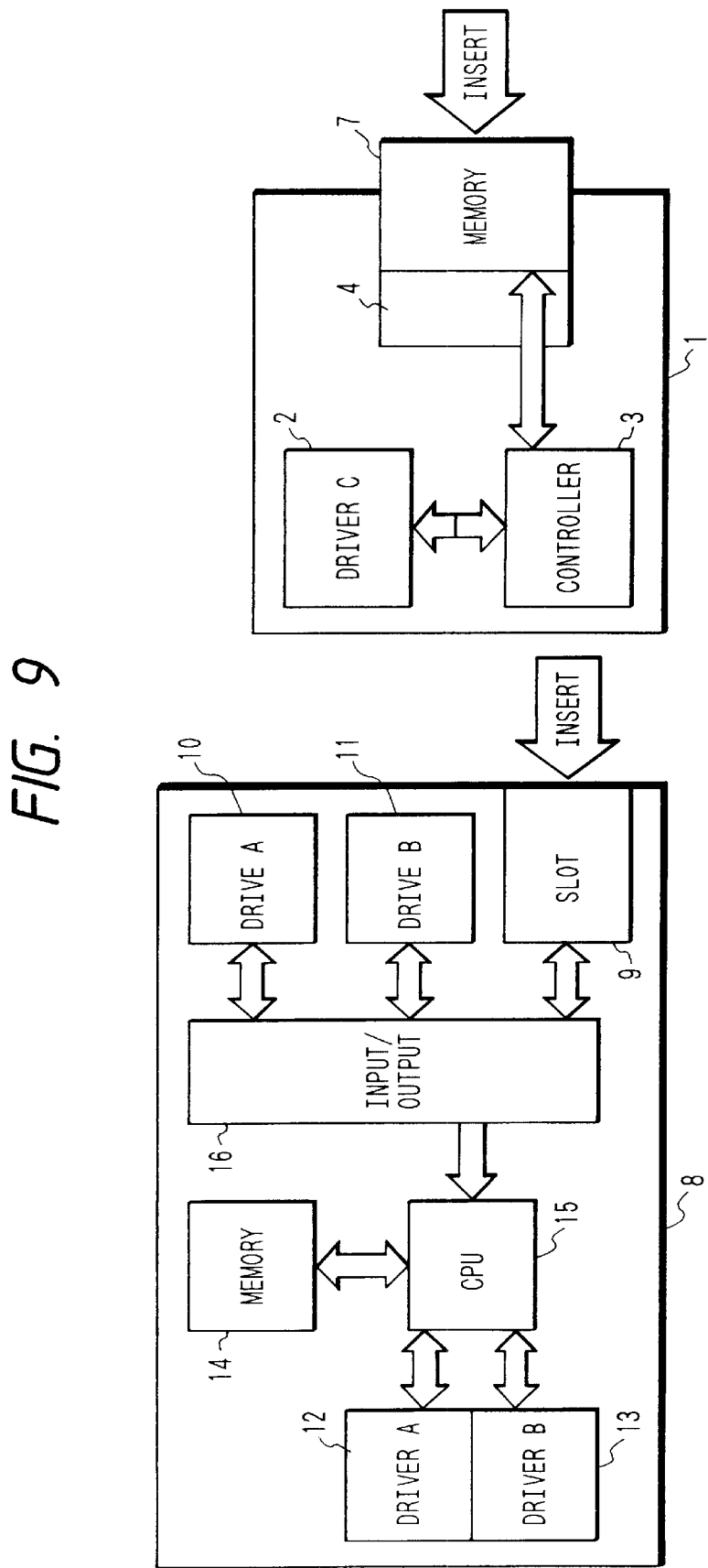
FIG. 9 is a view showing the structure of the adaptor of the present invention and of an equipment utilizing said adaptor.

In the following there will be explained a fourth embodiment of the present invention. FIG. 7 shows the configuration of an adaptor which is capable of supporting a memory medium and is adapted to be connected to a main equipment for enabling data writing into and data reading from said memory medium and which is featured by comprising means (driver storage element) for memorizing means (driver) for controlling said memory medium, wherein the driver stored in said driver storage element is re-writable. Also FIGS. 8 and 9 are respectively a schematic view and a block diagram of a system utilizing the above-mentioned adaptor.

In these drawings there are shown an adaptor 1 of the present invention, a re-writable driver storage element 2 featuring the present invention and loaded in said adaptor, a controller 3 for controlling the memory medium by the driver of the drive storage element, a slot 4 for inserting the memory medium, a connector 5 for engaging with the memory medium, a connector 6 for engaging with the main equipment, a memory medium 7 not provided therein with means for controlling the memory elements, a main equipment 8 for data processing, and a slot 9 provided in the main equipment for accepting the adaptor 1.

The driver storage element 2 stores a driver for access control of the main equipment 8 to the memory medium 7, and index data indicating the kinds of the memory media 7 drivable by said driver (for example flash memory, rigid disk, magnetooptical disk, SRAM, DRAM etc.), application (for example driver 7a, driver and memory 7b, or memory 7c), total capacity, used capacity (capacity for driver and capacity for memory), remaining capacity, user's area, associated properties, etc.

The power supply line in the connector 6 for connection with the main equipment is common for all the memory media (devices indicated by the kinds of memory media in the index data).

In the present embodiment, a flash memory is adopted as the driver storage element 2 and the memory medium 7, but there may also be employed an EEPROM or a SRAM/DRAM with a back-up power source.

Also in the present embodiment, said adaptor is provided with only one slot for the detachable memory medium, but there may be provided plural slots.

The driver may be varied by transferring a driver, prepared in the external software development, through the connector 6 to the controller 3 and by storage in the driver storage element 2, or by inserting a memory medium 7a or 7b storing such driver in the slot 4 and by storage in the driver storage element 2 through the connector 5 by an external program.

However, the index of the memory medium itself is independent of the index of the stored driver, and the kinds of the memory media are not necessarily the same as those drivable in the stored driver.

Figure 10:
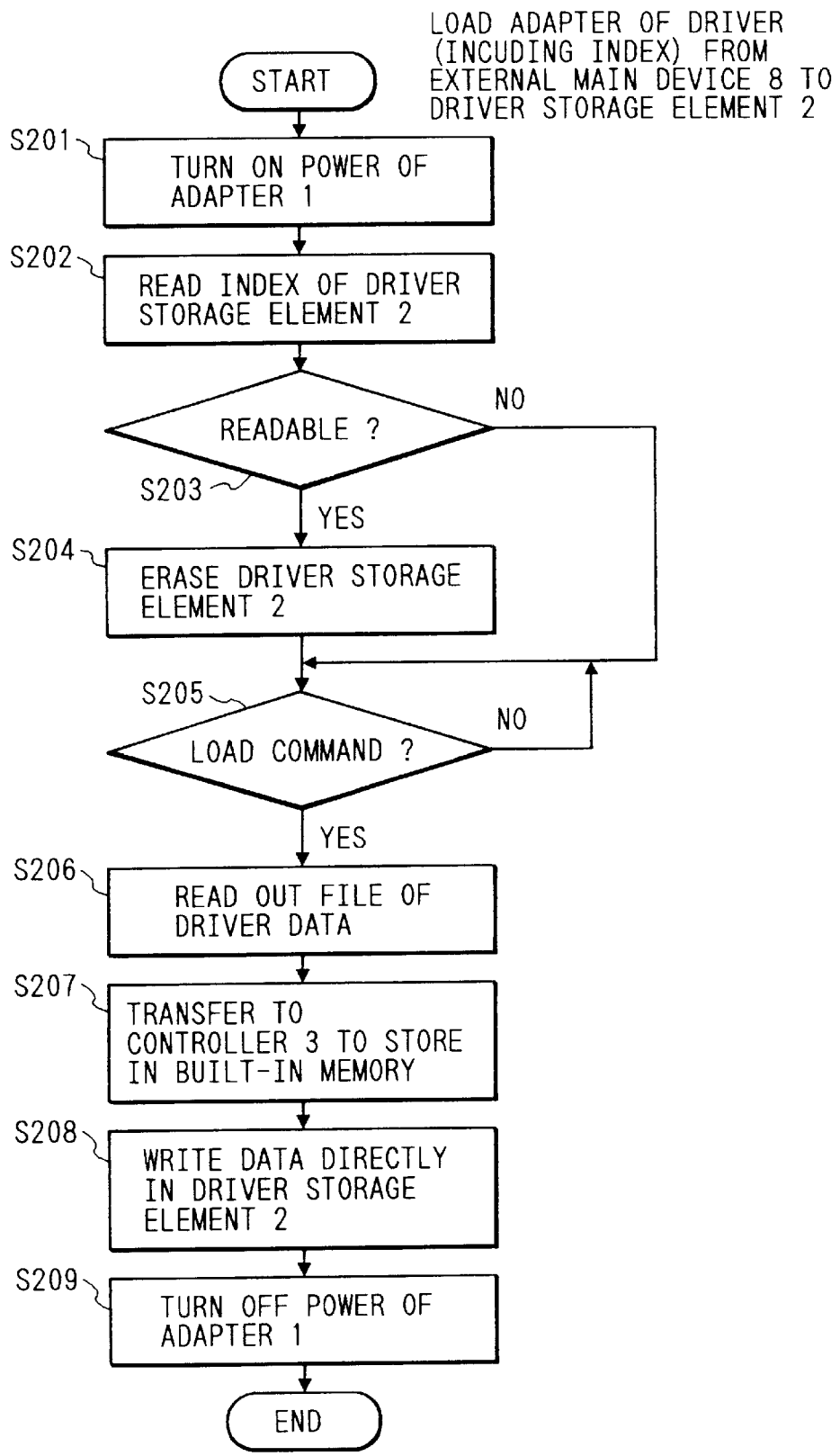
FIG. 10 is a flow chart showing an example of loading driver data from a main equipment into the driver storage element.

The present embodiment employs a method of preparing a driver in the software development in a main piece of equipment as shown in FIG. 8 and storing said driver in the driver storage element 2 by transfer to the controller through the connector 6, and the flow of these operations is schematically shown in FIG. 10. As explained before, a flash memory is employed as the memory medium 7a or 7b storing the driver and the driver storage element 2.

Said flow will be explained in the following with reference to FIG. 10.

In a program for loading the driver storage element 2 with a driver prepared in the main equipment, at first power is supplied to the slot 9 mounted with the adaptor 1 (S201), and all the index data of the driver storage element 2 of the adaptor 1 are read (S202). If the data are readable, the data of the driver storage element 2 are erased (S203, S204), and a loading command is awaited (S205). Then the file of the driver data prepared in the main equipment is read (S206), then transferred to the controller 3 and temporarily stored in an internal memory thereof (S207), and data accumulated in said memory are written into the driver storage element 2 (S208). Finally the power supply to the slot 4 mounted with the adaptor 1 is cut off (S209) and the sequence is terminated.

Also, in a case of loading the driver storage element 2 of the adaptor 1 with a new driver in the method of the foregoing embodiment, or of varying an existing driver, the driver in the driver storage element 2 can be varied utilizing the memory medium 7a or 7b storing the driver 1.

A fifth embodiment provides a method of inserting the adaptor 1, mounted with a memory medium 7a or 7b storing the driver, in the slot 9 of the main equipment as shown in FIG. 8, and fetching the driver stored in the memory medium 7a or 7b in the driver storage element 2 through the connector 5 under the control of a program of said main equipment. The flow of these operations is schematically shown in FIGS. 11A and 11B. Flash memories are employed as the memory medium 7a or 7b storing the driver and the driver storage element 2.

Said operations will be explained in the following with reference to FIGS. 11A and 11B.

In the execution of a program, in the main equipment, for fetching the driver stored in the memory medium 7a or 7b into the driver storage element 2, at first electric power is supplied to the slot 9 mounted with the adaptor 1 and to the slot 4 (S101), and all the indexes of the driver storage element 2 on the adaptor 1 are read (S102, S103). Then all the indexes of the memory medium 7a or 7b, inserted in the slot 4 of the adaptor 1 and storing the driver (S104, S105). Then there is confirmed, from the index data read in the above-mentioned steps S102, S104, whether the memory medium 7a or 7b is within the memory media drivable by the driver. However, if the index data are not readable, or if the memory medium is not within the drivable memory media (S103, S105, S106), an error is identified (S114) and the power supply to the slot 9 mounted with the adaptor is turned off (S115).

Subsequently, the content, namely the application of the memory medium (driver only 7a, driver and memory 7b, or memory only 7c) is discriminated (S107), and only in case said application is related with the driver (7a or 7b), a loading command is awaited (S108) and the data of the driver storage element 2 are erased (S109). Then the storage position of the driver data (including index data) on the memory medium 7a or 7b is detected and the controller 3 is caused to effect data reading from said storage position (S110). The transferred data are temporarily stored in an internal memory of the controller 3 (S111), and the data accumulated in said memory are periodically written into the driver storage element 2 (S112). Finally the power supply to the slots 4, 9 is turned off (S113).

In the equipment of small package size such as the digital still camera or the notebook-sized personal computer, the above-mentioned memory medium 7 not provided therein with the means for controlling the memory elements is extremely effective for achieving compactization of the equipment itself, and there can naturally be conceived an equipment capable of directly accepting such memory medium 7 and making direct connection therewith. However, such adaptor 1 is effective in case of utilizing the above-mentioned memory medium 7 in an equipment designed for the conventional memory medium provided therein with means for controlling the memory elements, or in a case of utilizing a variety of such memory media 7 including the upgraded versions thereof, or in case of utilizing, in an equipment, the data of plural memory media prepared in plural equipment in which the kind of usable memory medium is fixed.

A sixth embodiment provides a digital still camera capable of utilizing the adaptor 1, as an example of the above-mentioned three cases, and the block diagram of said camera is shown in FIG. 12.

In FIG. 12 there are shown a phototaking lens 28, an image pickup unit 20, means 19 for converting analog signals, obtained by phototaking, into digital signals, a memory 14 for temporarily storing the digital signals obtained by the conversion means 19, means 24 for measuring the distance to the object, a strobe flash unit 25, means 26 for measuring the luminance of the object, a light modulation circuit 27 for the strobe flash unit, various switches 21, a display panel 22, display LED's 23, a controller 17 including control programs for the components 21, 22, 23, and a driver 18 for driving the distance measuring means, light metering means light modulating means and strobe flash unit. In the present embodiment the adaptor is provided with only one slot for accepting the detachable memory medium, but there may also be provided plural slots.

The digital still camera detects the state of a main mode selector switch (S301), and effects operations according to either of the flows shown in FIGS. 13 to 18A and 18B, according to the selected mode.

Figure 13:
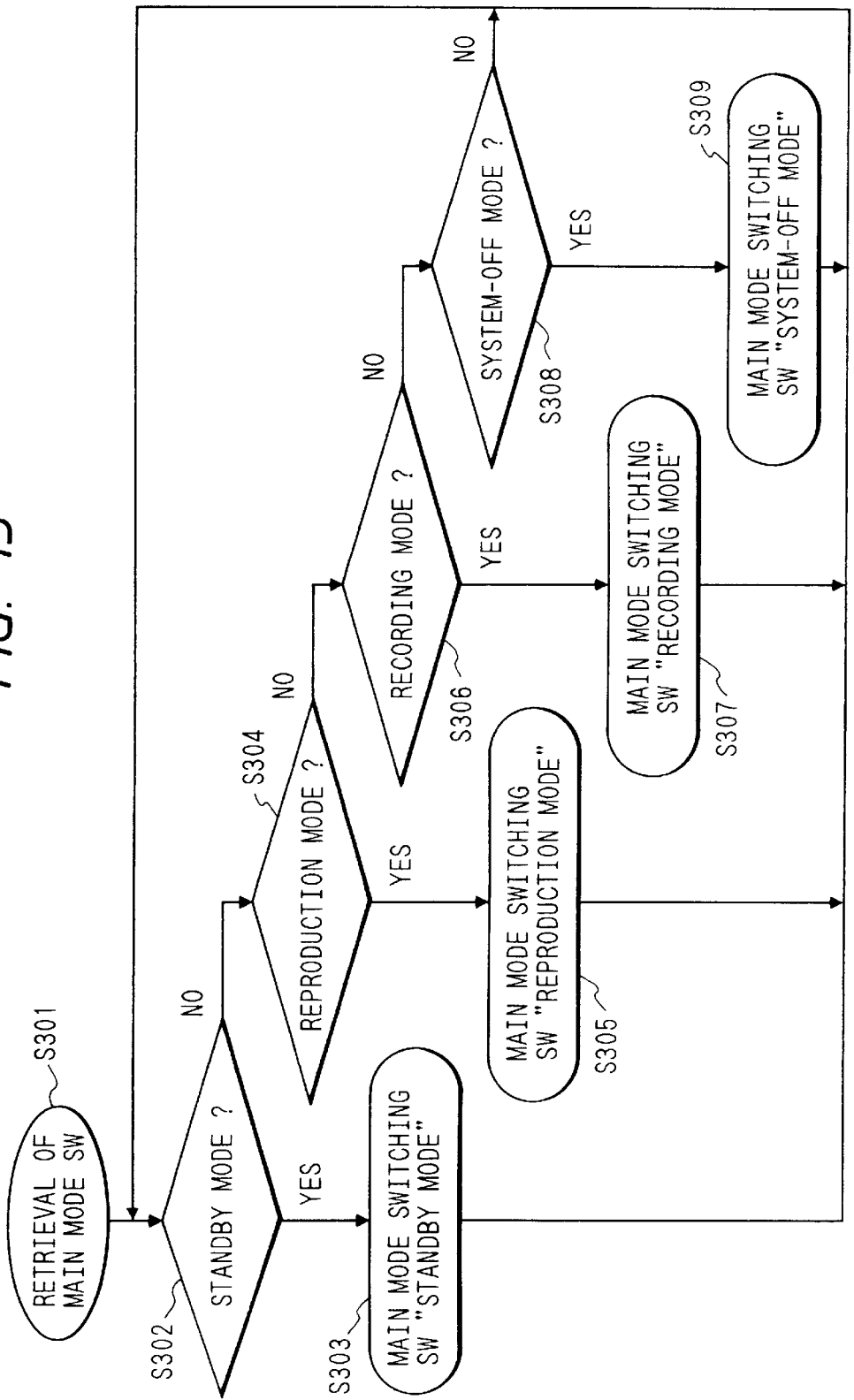
FIGS. 13 to 17 are flow charts showing the function of a digital still camera constituting an embodiment of the present invention.

The detection of the state of the main mode selector switch (S301) is conducted according to a sequence shown in FIG. 13, of which the details will not be explained.

Figure 14:
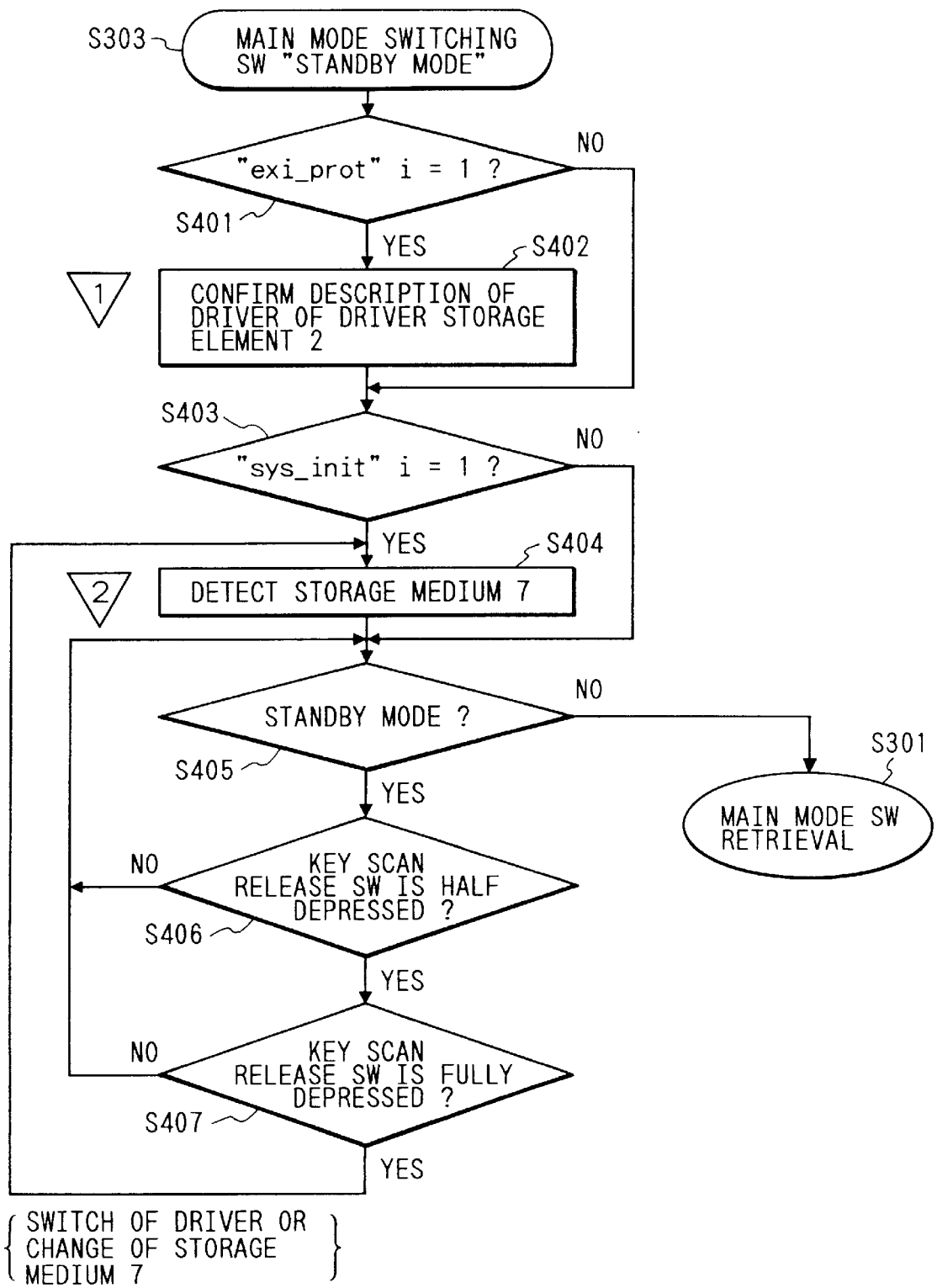

At first there will be explained, with reference to FIG. 14, the sequence when said selector switch is shifted to a "stand-by mode".

At first there is confirmed that a driver is loaded in the driver storage element 2, by the absence of a status flag "exi_prot" (S401). In the case of the absence of said flag, the electric power is supplied to the adaptor 1, and the index data are read from the driver storage element 2 and the content is confirmed (S402) as will be explained later in connection with FIGS. 16A and 16B.

Then the completion of system initialization is confirmed by the absence of a status flag "sys_init" (S403).

Figure 17:
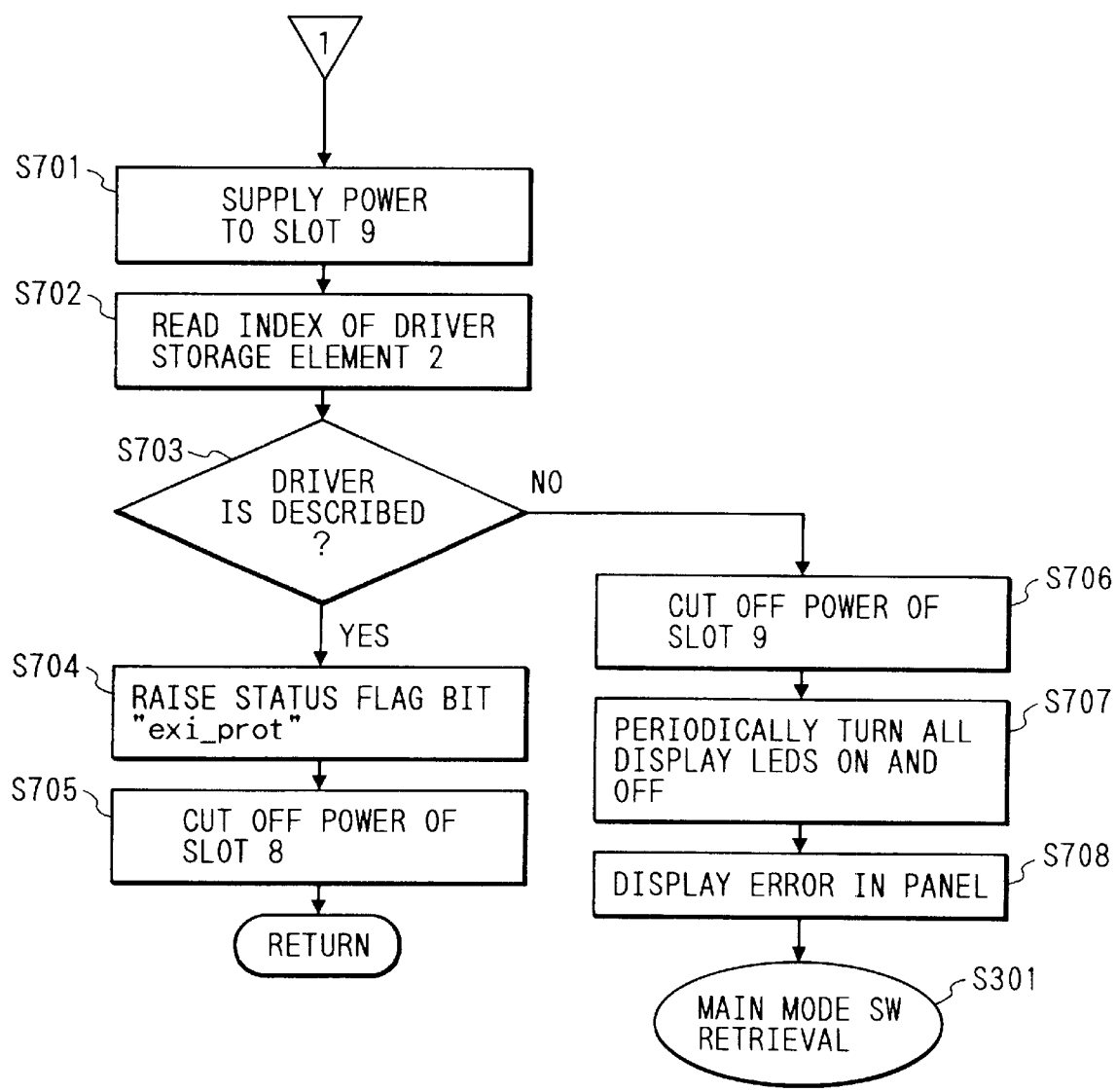

In the absence of said flag, the content of the memory medium 7 inserted in the slot 4 of the adaptor 1 is detected by the index data reading (S404) as will be explained later with reference to FIG. 17. After the system initialization is identified already complete in the preceding step S403 or after the confirmation of the content of the memory medium 7 and the completion of system initialization, it is again confirmed that the main mode selector switch is in the "stand-by mode" (S405). If it is not in the "stand-by mode", the sequence returns to search the mode again (S301). In the case of the "stand-by mode", there is discriminated whether a shutter release switch has been depressed by a half stroke (S406), and, only in a case where said shutter release switch has been depressed by a full stroke (S407), the content of the memory medium 7 inserted in the slot 4 is again confirmed (S404). If the data stored in the memory medium 7 contains a driver, there can be effected the variation of the driver and the re-start of the system.

In the present digital camera, the driver storage element 2 is composed of a flash memory capable of retaining the stored data. An EEPROM may also be employed in a similar manner. Furthermore SRAM/DRAM can store the data by the use of a secondary battery.

FIGS. 11A and 11B also show the confirmation, in the stand-by mode, of the description of the driver in the driver storage element 2 loaded in the adaptor 1. At first electric power is supplied to the slot 9, mounted with the adaptor 1, of the digital camera (S701), and the index of the driver of the driver storage element 2 is read (S702). If said index is stored, the status flag "exi_prot" is set and the sequence returns (S703, S704, S705). In a case where it is not stored, the power supply to the slot 9 mounted with the adaptor 1 is cut off, then all the display LED's are made to flash (S707), the error state is displayed on the display panel 22 (S708), and the sequence returns to the search of the main mode selector switch (S301).

Figure 18B:
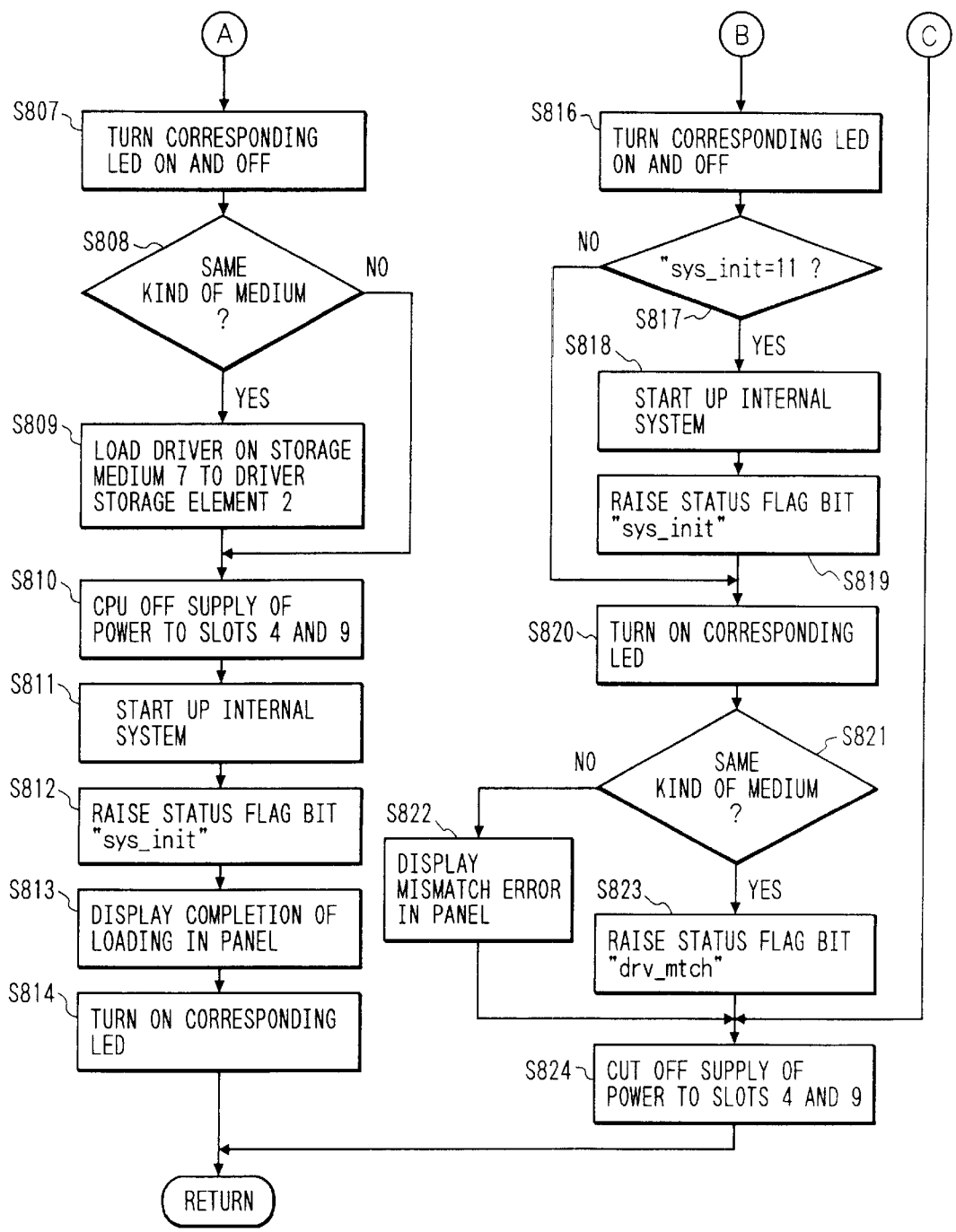
FIG. 18 is comprised of FIGS. 18A and 18B illustrating flow charts showing the function of a digital still camera constituting an embodiment of the present invention.

FIGS. 18A and 18B show the sequence of detection of the memory medium 7. At first electric power is supplied to the slot 9 of the main equipment and the slot 4 of the adaptor 1 (S801), and the index of the mounted memory medium 7 is read to discriminate whether the driver is contained in the memory medium 7 (S802, S803, S804, S805).

In case the driver is contained in the memory medium 7 (cases 1 and 2 in S805), the index of the driver in the memory medium 7 is read, and the display LED 23 indicating the kind of the driver stored in the memory medium 7 is made to flash (S807). Then there is confirmed whether the kind of the driver stored in the memory medium 7 is the same as that of the driver in the driver storage element 2 in the adaptor 1 (S808), and, only if they are different, the driver in the memory medium 7 is loaded in the driver storage element 2 (S809). If both drivers are the same, or after the driver loading, the power supply to the slots is terminated (S810). Subsequently, the system in the digital camera is initialized (S811), then a flag "sys_init" indicating the completion of system initialization is set (S812), the completion of loading is displayed on the display panel (S813), and the display LED 23 indicating the kind of the loaded driver is turned on (S814). In a case where the memory medium cannot be read or is not inserted, all the display LED's 23 are made to flash intermittently (S825) and the power supply to the slots is terminated (S824).

If the driver is not contained in the memory medium 7 (case 3 in S805), there is at first confirmed whether a status flag "exi_prot" has been set (S815).

If said flag has been set, the display LED 23 indicating the kind of the driver is made to flash (S816). Then there is discriminated whether the status flag "sys_init" has been set (S817), and, if not, the system in the digital camera is initiated and the initialization completion flag "sys_init" is set (S819). If the system initialization is already complete or after the initialization is completed, the display LED 23 indicating, the kind of the driver is turned on (S820), and it is discriminated whether the kind of driver is same as that in the memory medium 7 (S821). If they are of a same kind, a status flag "drv_mtch" is set (S823), but if they are different, the matching error is displayed on the display panel 22 (S822).

If the status flag "exi_prot" has not been set, all the display LED's 23 are made to flash intermittently (S825), and the power supply to the slots is terminated (S824).

This mode is principally used for the system switching for varying the kind of the memory medium 7 or for the switching to another memory medium 7 of the same kind.

Figure 15B:
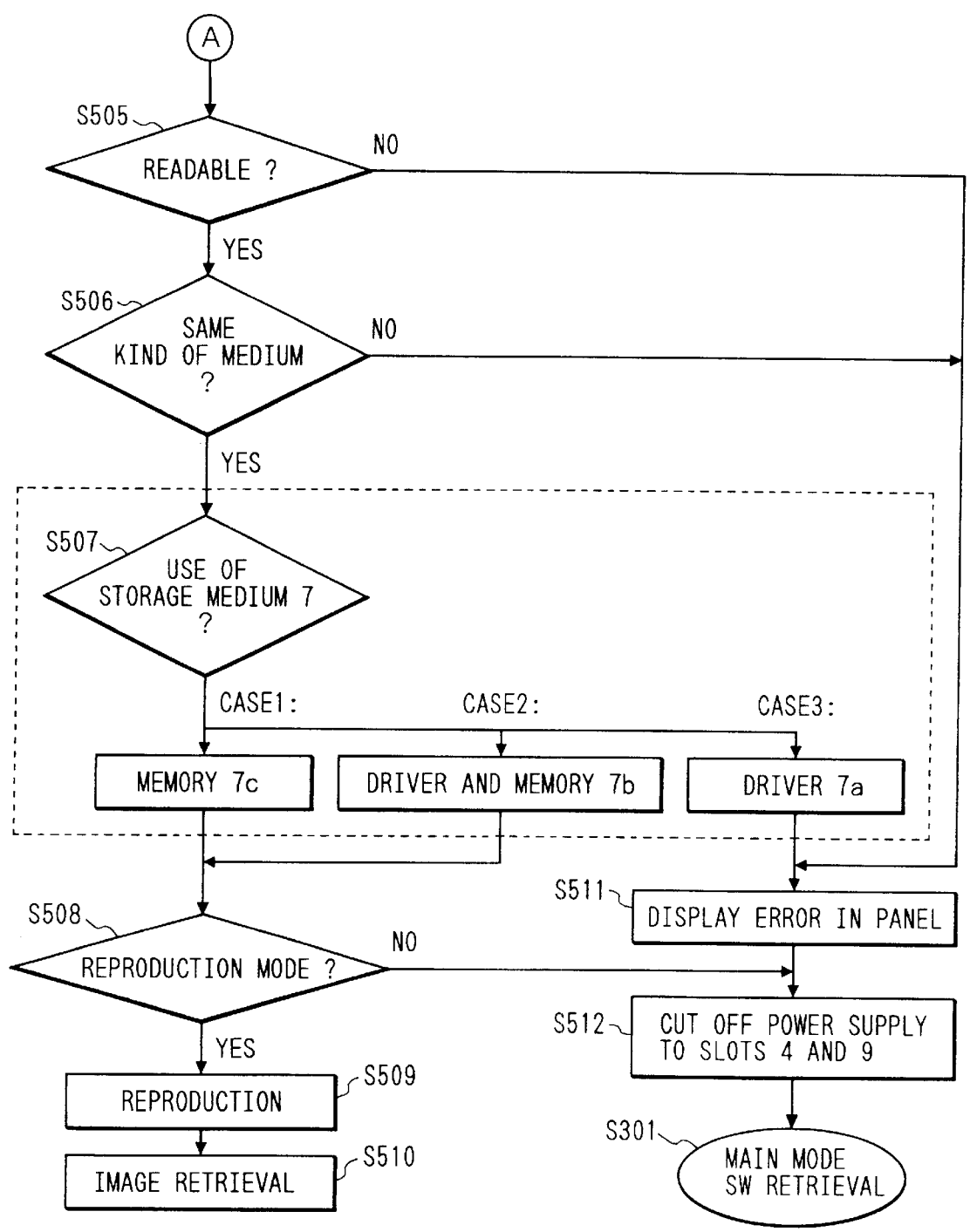

In the following there will be explained, with reference to FIGS. 15A and 15B, the sequence when the main mode selector switch is shifted to a "reproduction mode".

At first there are confirmed the loading of the driver in the driver storage element 2 by the presence of the status flag "exi_prot" and the completion of the system initialization by the presence of the status flag "sys_init" (S501, S502).

Only if both status flags have been set, the electric power is supplied to the slot 9 of the main equipment and the slot 4 of the adaptor 1 (S503). Then the index of the inserted memory medium 7 is read to confirm whether the kind of the driver is same as that of the memory medium 7 (S504).

If the index is not readable or if the drive is not possible because of the different kinds, the error state is displayed on the panel 22 (S511), and the power supply to the slots is terminated (S512), and the sequence returns to the detection of status of the main mode selector switch (S301).

Also when the kind of the driver is same as that of the memory medium 7, the application thereof is discriminated from the index thereof, and, if the application is limited to the driver (case 3 in S507), the error state is displayed on the panel 22 (S511). Then the power supply to the slots is terminated (S512), and the sequence returns to the detection of state of the main mode selector switch (S301).

Consequently the reproduction is executed only in a case where the driver is loaded in the driver storage element 2 of the adaptor 1, the system initialization is completed, the kind of the memory medium 7 matches that of the driver and the content of the memory medium contains the memory. When these conditions are satisfied, it is again confirmed that the main mode selector switch is in the "reproduction mode" (S508), and there can thereafter be executed reproduction (S509) and retrieval (S510).

If either of the above-mentioned status flags has not been set, all the display LED's are made to flash intermittently (S513), and there is again confirmed whether the main mode selector switch is in the "reproduction mode" (S514). If it is not in the "reproduction mode", the sequence returns to the detection of status of the main mode selector switch (S301), but, if it is in the "reproduction mode", it is discriminated whether the shutter release switch has been depressed by a half stroke (S515). Subsequently, only if the shutter release switch has been depressed by a full stroke (S516), the electric power is supplied to both slots and the detection of the inserted memory medium 7 is conducted again (S404).

This mode is used principally for the reproduction of memory medium 7, but can also be used for the driver loading or for the change to another memory medium 7 of a same kind, depending on the situation of the system initialization.

Figure 16B:
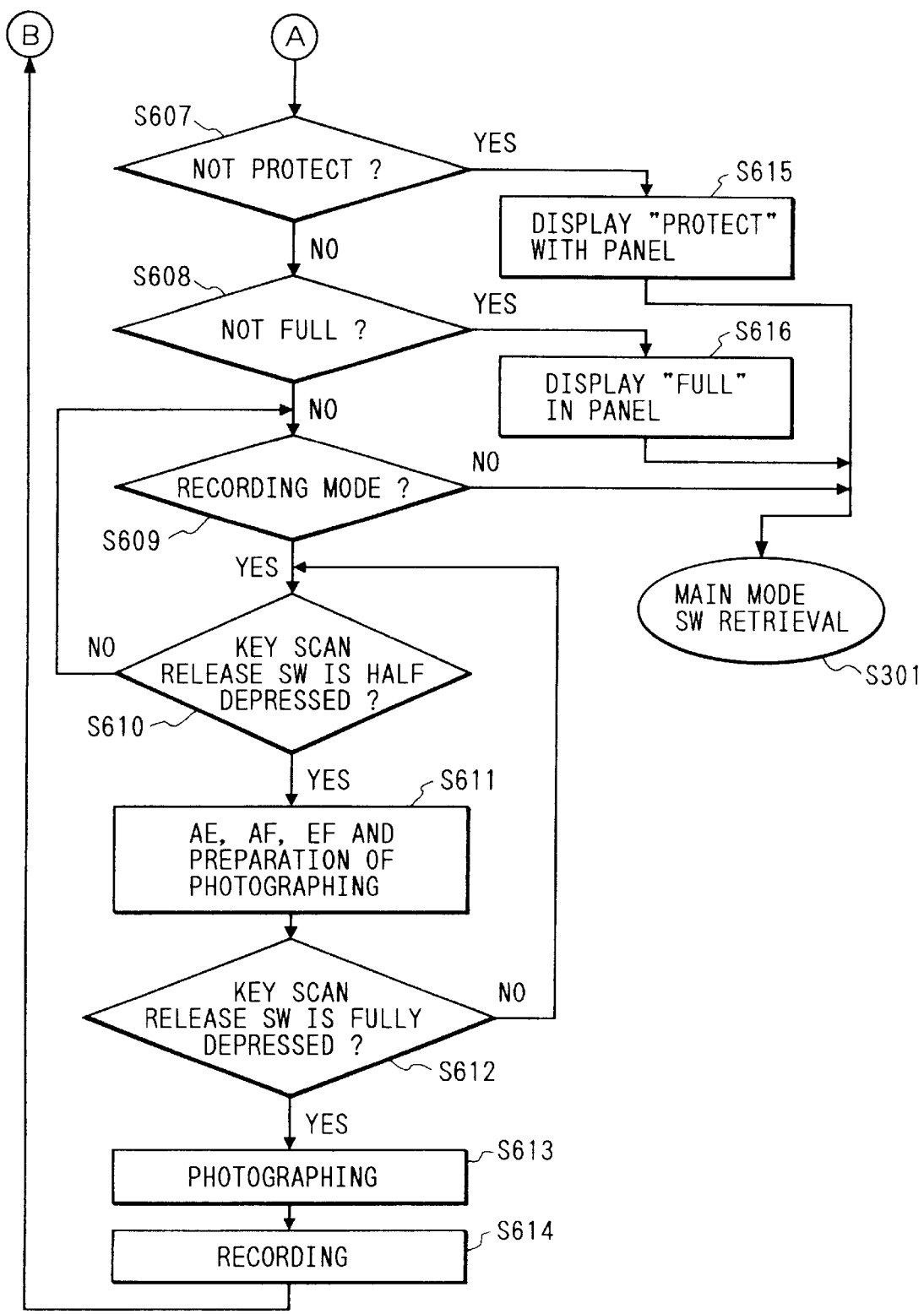

In the following there will be explained, with reference to FIGS. 16A and 16B, the operations when the main mode selector switch is shifted to a "recording mode".

At first there are confirmed the loading of the driver in the driver storage element 2 by the presence of the status flag "exi_prot", and the completion of system initialization by the presence of the status flag "sys_init" (S601, S602).

If both flags have been set, the electric power is supplied to both slots (S603), then the index of the inserted memory medium 7 is read (S604), and the power supply to said slots is turned off (S605).

Then there are discriminated, from the read index data, whether the kind of the driver is same as that of the memory medium (S606), whether the writing to the memory medium 7 is not inhibited (S607) and whether the memory has the remaining capacity (S608), and the recording mode is started after re-confirmation that the main mode selector switch is in the "recording mode" (S609).

In the recording mode, it is detected whether the shutter release switch has been depressed by a half stroke (S610), and there are executed light metering, distance measurement, flash light adjustment and preparation for phototaking operation (S611). Then there is detected whether the shutter release switch has been depressed by a full stroke (S612), and, if depressed, there are conducted the phototaking and recording operations (S613, S614).

In a case where either of the above-mentioned status flags has not been set, all the display LED's are made to flash intermittently (S617), and the sequence returns to the detection of state of the main mode selector switch (S301).

This mode is principally used for the, recording in the memory medium 7. The recording mode cannot be conducted in a case where the driver is not installed, or in a case where the system is not initialized, or in a case where the kind of the memory medium 7 is different from that of the driver, or in a case where the memory medium 7 is protected from writing.

In the following there will be explained a seventh embodiment of the present invention, providing a second example of the aforementioned three methods of utilization, for developing or processing, in an equipment such as a desk-top personal computer or in a work station, the data in the memory media 7 of plural kinds, prepared in plural equipment as shown in FIGS. 8 and 9.

In this case, instead of adding all the driver storage elements for all the memory media 7 mentioned above in the equipment, all the data of the drivers for driving said memory media are stored in said equipment, and the adaptor mounted with an object memory medium is connected to said equipment.

Then, in the driver loading program, said equipment loads a driver, selected according to the kind of the connected memory medium 7, into the driver storage element 2 of the adaptor 1.

The driver has to be modified in content according to the change in the memory medium 7. However, according to the present invention, the driver in the driver storage element 2 is re-writable and can be loaded from the memory medium 7 or from the external equipment, owing to the presence of the index data in the driver.

Also, in a small-packaged equipment such as a digital still camera or a notebook-sized personal computer, the memory medium 7 not provided therein with means for controlling the memory elements is extremely effective for achieving compactization of such equipment itself, and the use of the adaptor 1 enables easy matching between the driver and the memory medium 7. More specifically, it is made possible to handle many memory media 7 by varying the driver with a single adaptor.

Also, for the same reason, it is rendered possible, even in the conventional equipment or apparatus, to utilize the memory medium not provided therein with means for controlling the memory elements, by the use of the adaptor 1 with the driver storage element 2.

Also, in a case of developing or processing the data of the memory media 7 of plural kinds, the use of the adaptor enables easy access to such memory media 7 within a limited space, instead of the addition of the driver storage elements, corresponding to such plural memory media, in the equipment.

The driver has to be modified in content according to the change in the memory medium 7. However, as explained in the foregoing embodiments of the present invention, the driver stored in the driver storage element 2 is re-writable and can be loaded from the memory medium 7 or from the external equipment, owing to the presence of the index data in the driver. Consequently the equipment can respond to the change in the memory medium without any change in the equipment itself.

Also, in the small-packaged equipment such as a digital still camera or a notebook-sized personal computer, the memory medium not provided therein with means for controlling the memory elements is extremely effective for achieving compactization of such equipment itself, and the use of the adaptor 1 enables easy matching between the driver and the memory medium 7. More specifically, the equipment can be made to accept various memory media 7 by the change of the driver in an adaptor.

Also for the same reason, it is rendered possible, even in the conventional equipment or apparatus, to utilize the memory medium not provided therein with means for controlling the memory elements, by the use of the adaptor with the driver storage element.

Furthermore, in a case of developing or processing the data of the memory media 7 of plural kinds, the use of the adaptor enables easy access to such memory media 7 within a limited space, instead of the addition of the driver storage elements corresponding to such plural memory media in the equipment.

Based on the foregoing, it is furthermore rendered possible to maintain the compatibility of the memory media, whereby an equipment can make access to the data of the memory medium recorded in another equipment. It is furthermore made possible to reduce the number of slots of the equipment, even to one at minimum, and to reduce the running cost and the design and manufacturing costs of the equipment including the data accumulation device.

What is claimed is:

1. An adaptor, comprising:
   a first connector adapted to be connected with an external piece of equipment that utilizes a first transmission mode, the first transmission mode being a parallel data transmission mode;
   a second connector adapted to be connected with a memory medium that utilizes a second transmission mode, the second transmission mode being a serial data transmission mode;
   storage means for storing first control data for use in converting the transmission mode;
   conversion means for converting the transmission mode of data to be transmitted between said first connector and said second connector by using the control data stored in said storage means;
   judgment means for judging a type of second control data, the second control data being stored in the memory medium that is connected to said second connector; and
   storage control means for causing said storage means to store the second control data by transferring the second control data stored in the memory medium to said storage means, when said judgment means judges that the second control data stored in the memory medium is different from the first control data stored in said storage means.

2. An adaptor according to claim 1, further comprising an adaptor main body detachably insertable in a memory card slot of a unit of information equipment, and wherein said first connector constitutes, in combination with the connector in said memory card slot, a parallel interface for effecting conversion of data in parallel data form with the information equipment, while said second connector constitutes, in combination with the connector of said memory card, a serial interface for effecting conversion of data in serial data form with the external equipment, and said adaptor main body includes, as said conversion means, parallel/serial conversion means for converting said parallel data into serial data, serial/parallel conversion means for converting said serial data into parallel data, and control means for controlling the function of at least one of said parallel interface, serial interface, parallel/serial conversion means and serial/parallel conversion means.

3. An adaptor, comprising:
   first means for supporting and electrically connecting one of plural different kinds of detachable memory mediums;
   second means for electrical connection to an apparatus for data writing into and/or data reading from the detachable memory medium;
   storage means for storing first control data for use in converting a transmission mode;
   conversion means for converting the transmission mode of data to be transmitted between said first means and said second means by using the control data stored in said storage means;
   judgment means for judging a type of second control data, the second control data being stored in the detachable memory medium; and
   storage control means for causing said storage means to store the second control data by transferring the second control data stored in the memory medium to said storage means, when said judgment means judges that the second control data stored in the memory medium is different from the first control data stored in said storage means.

4. An adaptor according to claim 3, further comprising:
   control means for controlling the detachable memory medium according to said control data, outputted from said storage means.

5. An adaptor according to claim 4, wherein said storage means stores, in addition to said control data for the detachable memory medium, index data including at least one of information as to a kind, application, capacity, attribution and memory area prepared for a user of the mounted detachable memory medium.

6. An adaptor according to claim 4, wherein said storage means comprises a flash memory.

7. An adaptor according to claim 4, wherein said storage means comprises an EEPROM.

8. An adaptor according to claim 4, wherein said storage means comprises an SRAM and said adaptor further comprises a power source for said storage means.

9. An adaptor according to claim 4, wherein said storage means comprises a DRAM, and said adaptor further comprises a power source for said storage means.

10. An adaptor according to claim 3, wherein said storage means stores, in addition to said control data for the detachable memory medium, index data including at lest one of information as to a kind, application, capacity, attribution and memory area prepared for a user of the mounted detachable memory medium.

11. An adaptor according to claim 10, wherein said storage means comprises a flash memory.

12. An adaptor according to claim 10, wherein said storage means comprises an EEPROM.

13. An adaptor to claim 10, wherein said storage means comprises an SRAM, and said adaptor further comprises a power source for said storage means.

14. An adaptor according to claim 10, wherein said storage means comprises a DRAM, and said adaptor further comprises a power source for said storage means.

15. An adaptor according to claim 3, wherein said storage means comprises a flash memory.

16. An adaptor according to claim 3, wherein said storage means comprises an EEPROM.

17. An adaptor according to claim 3, wherein said storage means comprises an SRAM, and said adaptor further comprises a power source for said storage means.

18. An adaptor according to claim 3, wherein said storage means comprises a DRAM, and said adaptor further comprises a power source for said storage means.

19. A data storage system comprising:

a memory medium provided without means for controlling memory elements;

supporting means for supporting said memory medium;

electrical connecting means for electrical connection to an apparatus for data writing into and/or data reading from said memory medium;

storage means for storing plural kinds of control data for use in controlling said memory medium, said storage means selectively outputting control data from among the plural kinds of stored control data to the apparatus;

judgment means for judging a type of second control data, the second control data being stored in said memory medium; and storage control means for causing said storage means to store new control data by transferring the second control data stored in the memory medium to said storage means, when said judgment means judges that the second control data stored in the memory medium is different from the first control data stored in said storage means.

20. A data storage system according to claim 19, wherein said storage means stores, in addition to said control data for the memory medium, index data including at least one of information as to a kind, application, capacity, attribution and memory area prepared for a user of the supported memory medium, and said index data are stored in the memory medium.

* * * * *

UNITED STATES PATENT AND TRADEMARK OFFICE
CERTIFICATE OF CORRECTION

PATENT NO.    : 6,457,647 B1
DATED         : October 1, 2002
INVENTOR(S)   : Toshiya Kurihashi et al.

It is certified that error appears in the above-identified patent and that said Letters Patent is hereby corrected as shown below:

Title page,
Item [56], FOREIGN PATENT DOCUMENTS,
"JP 0028892 2/1987" should read -- JP 61-028892 2/1987 --;
"JP 0014192 1/1991" should read -- JP 3-014192 1/1991 --;
"JP 3141486 6/1991" should read -- JP 3-141486 6/1991 --;
"JP 3194680 8/1991" should read -- JP 3-194680 8/1991 --;
"JP 5-24307 9/1993 … 235/486" should be deleted; and
"JP 524307 9/1993" should read -- JP 5-24307 9/1993 --.

Drawings,
Sheet 15, Figure 16A, "DISLPAY" should read -- DISPLAY -- and "ERORR" should read -- ERROR --.

Column 1,
Line 11, "of for example" should read -- of, for example, --;
Line 42, "anticipated" should read -- anticipated to be --;
Line 47, "those" should read -- those already used --;
Line 49, "those already used" should be deleted; and
Line 53, "such" should read -- such as --.

Column 2,
Line 2, "attachments" should read -- attachment -- and "detachment" should read -- detachment --.

Column 3,
Line 9, "object," should read -- object --; and
Line 49, "aft" should be deleted.

Column 4,
Line 20, "In an" should read -- In --.

Column 6,
Line 40, "control-programs" should read -- control programs --.

UNITED STATES PATENT AND TRADEMARK OFFICE
CERTIFICATE OF CORRECTION

PATENT NO. : 6,457,647 B1
DATED : October 1, 2002
INVENTOR(S) : Toshiya Kurihashi et al.

It is certified that error appears in the above-identified patent and that said Letters Patent is hereby corrected as shown below:

Column 7,
Line 62, "destructed," should read -- destroyed --; and
"economical" should read -- economic --.

Column 8,
Line 19, "thereof" should read -- therefor, --; and
Line 45, "an" should read -- a piece of --.

Column 9,
Line 2, "economical" should read -- economic --; and "an the" should read
-- on the --.

Column 11,
Line 11, "case" should read -- a case --;
Line 12, "in an" should read -- in a piece of --; and
Line 30, "means" (2nd occurrence) should read -- means, --.

Column 12,
Line 59, "indicating," should read -- indicating --.

Column 13,
Line 50, "memory" should read -- the memory -- and "for the" should read -- for --.

Column 14,
Line 18, "the," should be deleted; and
Line 28, "in an" should read -- in a piece of --.

Column 15,
Line 35, "an" should read -- a piece of --; and
Line 36, "another" should read -- another piece of --.

Column 16,
Line 64, "lest" should read -- least --.

UNITED STATES PATENT AND TRADEMARK OFFICE
CERTIFICATE OF CORRECTION

PATENT NO.     : 6,457,647 B1
DATED          : October 1, 2002
INVENTOR(S)    : Toshiya Kurihashi et al.

It is certified that error appears in the above-identified patent and that said Letters Patent is hereby corrected as shown below:

Column 17,
Line 5, "to" should read -- according to --.

Signed and Sealed this

Twenty-first Day of October, 2003

JAMES E. ROGAN
*Director of the United States Patent and Trademark Office*